US012738224B2

(12) United States Patent
Ahn et al.

(10) Patent No.: US 12,738,224 B2
(45) Date of Patent: Sep. 15, 2026

(54) PIXEL CIRCUIT AND DISPLAY APPARATUS INCLUDING THE SAME

(71) Applicant: LG Display Co., Ltd., Seoul (KR)

(72) Inventors: Soonsung Ahn, Paju-si (KR); Yeongyeong Bae, Goyang-si (KR); Jungchul Kim, Paju-si (KR); Yangwan Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/202,659

(22) Filed: May 8, 2025

(65) Prior Publication Data

US 2025/0349253 A1 Nov. 13, 2025

(30) Foreign Application Priority Data

May 10, 2024 (KR) ........................ 10-2024-0062133

(51) Int. Cl.
*G09G 3/3233* (2016.01)

(52) U.S. Cl.
CPC ..... *G09G 3/3233* (2013.01); *G09G 2300/043* (2013.01); *G09G 2300/0819* (2013.01); *G09G 2300/0842* (2013.01); *G09G 2310/08* (2013.01); *G09G 2330/021* (2013.01)

(58) Field of Classification Search
CPC ........... G09G 3/3233; G09G 2300/043; G09G 2300/0819; G09G 2300/0842; G09G 2310/08; G09G 2330/021
USPC ........................................................... 345/204
See application file for complete search history.

(56) References Cited

U.S. PATENT DOCUMENTS

| | | | | |
|---|---|---|---|---|
| 9,626,905 B2 * | 4/2017 | In | G09G 3/3233 | |
| 11,626,076 B2 * | 4/2023 | Yu | G09G 3/3266 | 345/204 |
| 2022/0366847 A1 * | 11/2022 | An | G09G 3/3233 | |
| 2023/0033778 A1 * | 2/2023 | Jung | G09G 3/3233 | |
| 2023/0122487 A1 * | 4/2023 | Yang | G09G 3/20 | 345/81 |

FOREIGN PATENT DOCUMENTS

KR 10-2631416 B1 1/2024

* cited by examiner

*Primary Examiner* — Calvin C Ma
(74) *Attorney, Agent, or Firm* — Fenwick & West LLP

(57) ABSTRACT

A display apparatus comprises a display panel including pixels. A pixel circuit of each pixel includes: a driving transistor having a first electrode corresponding to a first node, a gate electrode corresponding to a second node, and a second electrode corresponding to a third node; a light-emitting element having connected to the first node and a low-potential voltage; a storage capacitor connected to the second and first nodes; a compensation capacitor having one electrode connected to a fifth node and another electrode connected to a first voltage; a first transistor connected to the second and fifth nodes; a second transistor connected to the first node and a data voltage; a third transistor connected to a high-potential voltage and the fifth node; a fourth transistor connected to the fifth and third nodes; and a fifth transistor connected to the first node and a second voltage.

20 Claims, 28 Drawing Sheets

PIXEL CIRCUIT AND DISPLAY APPARATUS INCLUDING THE SAME

CROSS-REFERENCE TO RELATED APPLICATION

This application claims priority from Republic of Korea Patent Application No. 10-2024-0062133 filed on May 10, 2024, which is hereby incorporated by reference in its entirety.

TECHNICAL FIELD

The present disclosure relates to a display apparatus, and more particularly, to a pixel circuit and a display apparatus including the same.

BACKGROUND ART

As the information age is maturing, the field of display apparatuses, which visually display electrical information signals, is developing rapidly, and extensive research has been conducted on various display apparatuses to achieve the improved performance, thinning, weight reduction, low power consumption and the like.

Such display apparatuses are implemented in various forms, such as liquid crystal displays (LCDs) and organic light-emitting displays (OLEDs).

Display devices are constantly being improved to provide users with clearer images by increasing the resolution and brightness of the screen.

SUMMARY

Each pixel of an organic light-emitting display apparatus includes an organic light-emitting diode, a driving transistor, and a storage capacitor. In order to make the image quality uniform across the entire screen of the organic light-emitting display apparatus, the driving transistors need to have uniform electrical characteristics across all pixels.

Due to process deviations and element characteristic deviations that occur in the manufacturing process of the display panel, there may be deviations between pixels with regard to electrical characteristics, such as threshold voltage and mobility. In order to compensate for electrical characteristic differences between pixels, internal compensation techniques can be employed.

The electrical characteristics of the driving transistor in each pixel can be compensated with the use of a data voltage supplied through a data line. In this regard, there has been a problem in that the compensation time is restricted to 1H time (i.e. time of a horizontal period) because the use of the data line through which the data voltage is supplied is restricted to 1H time.

An object of an embodiment of the present disclosure is to provide a pixel circuit and a display apparatus including the same capable of compensating for electrical characteristics of pixels for a sufficient period of time to minimize or at least reduce compensation errors.

In addition, another object of an embodiment of the present disclosure is to provide a pixel circuit and a display apparatus including the same capable of separating a compensation period for compensating for electrical characteristics of pixels and a data program period for sampling a data voltage.

In addition, still another object of an embodiment of the present disclosure is to provide a pixel circuit and a display apparatus including the same capable of compensating for electrical characteristics of pixels with the use of a voltage unrelated to the data voltage.

The present disclosure may have other objects besides the aforementioned ones, which are clearly recognizable to a person skilled in the art from the description below.

According to an embodiment of the present disclosure, there is provided a pixel circuit and a display apparatus including the same capable of compensating for electrical characteristics of pixels for a sufficient period of time to minimize compensation errors. The pixel circuit of such a display apparatus includes at least one transistor diode-connecting a driving transistor. The pixel circuit compensates for characteristics of the driving transistor with the use of a voltage unrelated to a data voltage. The pixel circuit includes a compensation capacitor having one electrode at which a threshold voltage of the driving transistor is maintained during a compensation period and a data program period. The pixel circuit operates in following two separate periods: a compensation period and a data program period.

A pixel circuit of a display apparatus according to an embodiment includes a light-emitting element, a driving transistor controlling an intensity of current flowing to the light-emitting element, a storage capacitor which samples a data voltage that determines the intensity of the current, a compensation capacitor sampling a threshold voltage of the driving transistor, at least one first transistor diode-connecting the driving transistor, at least one second transistor applying a voltage unrelated to a data voltage to one electrode and the other electrode of the storage capacitor and one electrode of the compensation capacitor through the diode-connected driving transistor, and at least one third transistor applying the data voltage to the other electrode of the storage capacitor. Here, the pixel circuit of the display apparatus operates in following separate periods: a compensation period for compensating threshold voltage characteristics of the driving transistor and a data program period for sampling the data voltage.

According to embodiments, the display apparatus can overcome the problematic situation in which the compensation time is restricted to 1H time by using at least one transistor to diode-connect the driving transistor and compensating for characteristics of the driving transistor with the use of a voltage unrelated to the data voltage.

In addition, the display apparatus can accurately compensate for the threshold voltage characteristic of the driving transistor since the threshold voltage of the driving transistor can be maintained at the storage capacitor through the compensation capacitor during the compensation period and the data program period.

In addition, since the display apparatus compensates for characteristics of the driving transistor using a voltage unrelated to the data voltage, the display apparatus can operate in the data program period and the compensation period which are two distinctly separate periods, and through this, a sufficiently long time period can be allotted to the compensation time for compensating for the threshold voltage characteristic of the driving transistor.

In addition, the display apparatus can compensate for the threshold voltage characteristic of the driving transistor for a sufficient amount of time, so that the compensation error can be minimized even when the mobility of the driving transistor is low.

In addition, according to some embodiments, the display apparatus can remove power wiring for the anode reset voltage by using the voltage used for compensating the characteristics of the driving transistor as the anode reset voltage.

In addition, according to some embodiments of the present disclosure, since one electrode of the compensation capacitor is connected to one electrode of the storage capacitor, the threshold voltage of the driving transistor can be maintained at the storage capacitor, thereby accurately compensating for the threshold voltage characteristic of the driving transistor.

In addition to the effects described above, specific effects of the present invention will be described below together with specific details for practicing the invention.

DETAILED DESCRIPTION

Figure 1:
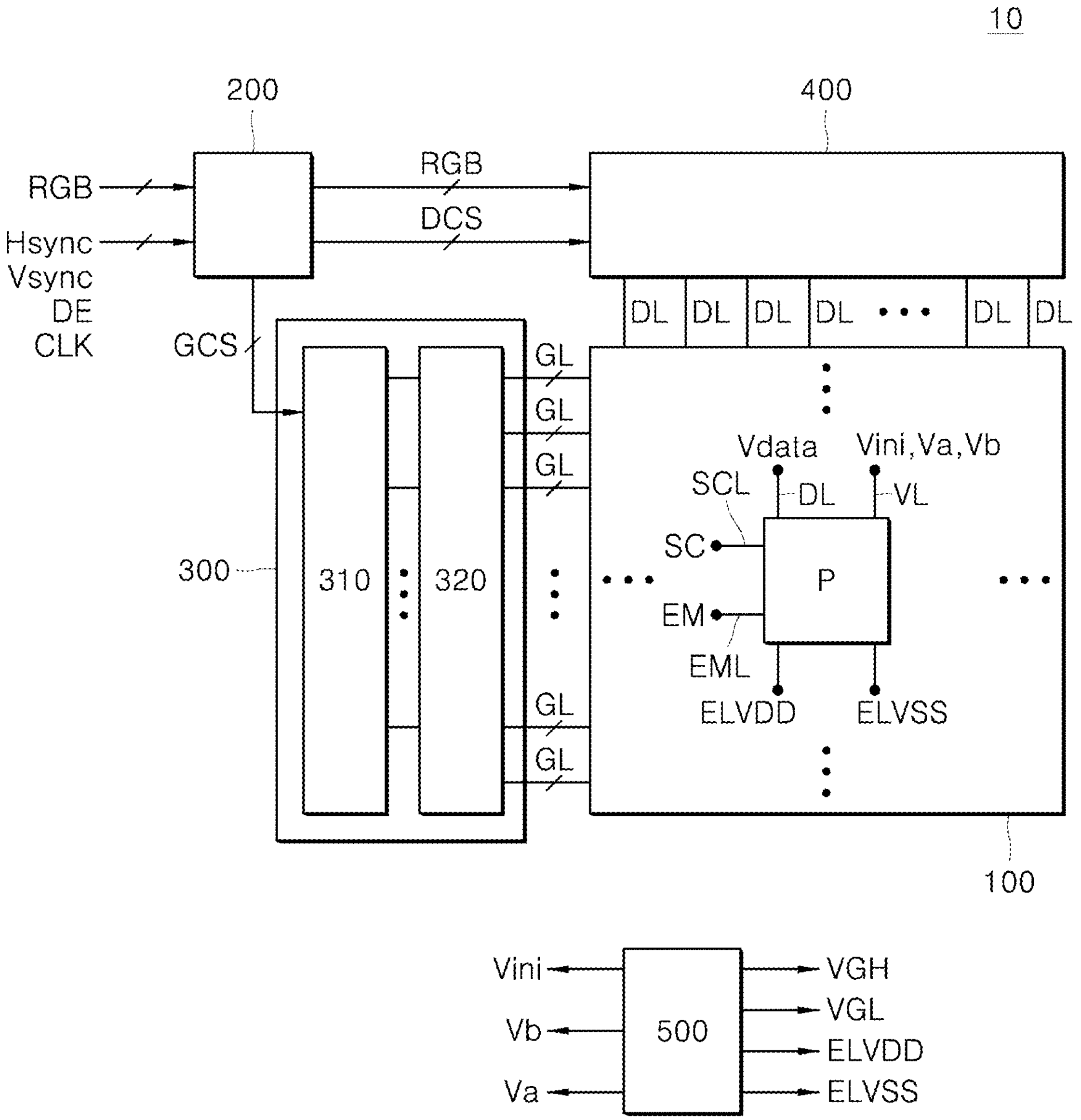
FIG. 1 is a block diagram showing an organic light-emitting display apparatus according to an embodiment of the present disclosure.

Advantages and features of the present disclosure, and a method of achieving the advantages and features will become apparent when referring to the following embodiments described later in detail together with the accompanying drawings. However, the present disclosure is not limited to the embodiments as disclosed below, but may be embodied in various different forms. Thus, these embodiments are set forth only to make the present disclosure complete, and to completely inform the scope of the present disclosure to those of ordinary skill in the technical field to which the present disclosure belongs.

A shape, a size, a ratio, an angle, a number, etc. disclosed in the drawings for illustrating embodiments of the present disclosure are illustrative, and the present disclosure is not limited thereto. Throughout the detailed description, like reference numerals refer to like components. Further, in describing the present disclosure, if it is determined that a detailed description of a related known technology may unnecessarily obscure the gist of the present disclosure, the detailed description thereof will be omitted. It will be further understood that the terms "comprise", "comprising", "include", and "including" when used in the present disclosure, specify the presence of the stated features, integers, operations, elements, and/or components, but do not preclude the presence or addition of one or more other features, integers, operations, elements, components, and/or portions thereof. When using an expression in a singular form to describe a component, it can include a meaning of a plural form unless explicitly stated to the contrary.

It should be noted that any component will be construed as including a tolerance or error range, even if there is no explicit description thereof.

In describing a temporal relationship, for example, when the temporal order is described as “after”, “subsequent”, “next”, and “before”, the case which is not continuous may also be included unless the term “just” or “directly” is used.

When describing the flow relationship of a signal, for example, in a case where ‘a signal is transmitted from node A to node B’, it can include a case where a signal is transmitted from node A to node B via another node, unless the term ‘immediately’ or ‘directly’ is used.

It will be understood that, although the terms “first”, “second”, etc. may be used herein to describe various elements, these elements should not be limited by these terms. These terms are only used to distinguish one element from another element. So, a first element referred to in the following description may represent a second element, without departing from the scope of the technical idea of the present disclosure.

The individual features of the various embodiments of the present disclosure may be coupled or combined with each other in part or in whole to be interconnected and operated in a variety of technical ways, and each embodiment may be implemented independently of each other or implemented together in an associative relationship.

Hereinafter will be described a display apparatus according to each of embodiments, which is capable of minimizing or at least reducing compensation errors by compensating for an electrical characteristic of a pixel for a sufficient period of time.

FIG. 1 is a block diagram showing an organic light-emitting display apparatus according to an embodiment of the present disclosure.

Referring to FIG. 1, a display apparatus 10 includes a display panel 100 including a plurality of pixels P, a controller 200, a gate driver 300 supplying a gate signal to each of the plurality of pixels P, a data driver 400 supplying a data signal to each of the plurality of pixels P, and a power supply unit 500 supplying power required for driving to each of the plurality of pixels P.

In the display panel 100, a plurality of gate lines GL and a plurality of data lines DL intersect with each other, and each of a plurality of pixels P is connected to a gate line GL and a data line DL. Specifically, one pixel P receives a gate signal from the gate driver 300 through the gate line GL, receives a data signal from the data driver 400 through the data line DL, and receives a high-potential driving voltage ELVDD and a low-potential driving voltage ELVSS from the power supply unit 500.

The gate line GL supplies a scan signal SC and an emission control signal EM, and the data line DL supplies a data voltage V data. Additionally, according to various embodiments, the gate line GL may include a plurality of scan lines SCL supplying scan signals SC, and an emission control signal line EML supplying an emission control signal EM. Additionally, the plurality of pixels P may further include a power line VL to receive at least one of an initialization voltage Vini, a first voltage Va, a second voltage Vb, and an anode reset voltage.

Additionally, each pixel P includes a light-emitting element and a pixel circuit controlling the driving of the light-emitting element. The pixel circuit includes a plurality of switching elements, driving elements, and capacitors. Here, the switching elements and the driving elements may be configured with thin film transistors. In a pixel circuit, the driving element controls the amount of current supplied to the light-emitting element according to a data voltage, thereby controlling the amount of light emitted by the light-emitting element. Additionally, the plurality of switching elements operate the pixel circuit by receiving the scan signals SC supplied through the plurality of scan lines SCL and the emission control signal EM supplied through the emission control line EML.

The display panel 100 may be implemented as a non-transmissive display panel or a transmissive display panel. The transmissive display panel may be applied to a transparent display apparatus that displays an image on a screen and has a visible actual background. The display panel 100 may be manufactured as a flexible display panel. The flexible display panel may be implemented as an OLED panel using a plastic substrate.

Each pixel P may be divided into a red sub-pixel, a green sub-pixel, and a blue sub-pixel to implement color. Each pixel P may also include a white sub-pixel. Each pixel P includes a pixel circuit.

On the display panel 100, a plurality of touch sensors may be disposed. Touch input may be sensed using separate touch sensors or through pixels P. The touch sensors may be disposed on the screen of the display panel as on-cell type or add on type or be implemented as in-cell type touch sensors built in the display panel 100.

The controller 200 processes image data RGB input from the outside to be suitable to the size and resolution of the display panel 100 and supplies the resultant of the processing to the data driver 400. The controller 200 generates a gate control signal GCS and a data control signal DCS by using synchronous signals input from the outside, such as a clock signal CLK, a data enable signal DE, a horizontal synchronous signal Hsync, and a vertical synchronous signal V sync. By supplying the generated gate control signal GCS and data control signal DCS to the gate driver 300 and data driver 400, respectively, the gate driver 300 and data driver 400 are controlled.

The controller 200 may be configured to be combined with various processors, such as a microprocessor, a mobile processor, an application processor, or the like, depending on the device on which it is mounted.

The host system may be any one of a television (TV) system, a set-top box, a navigation system, a personal computer (PC), a home theater system, a mobile device, a wearable device, or a vehicle system.

The controller 200 may control operation timings of the gate driver 300 and the data driver 400 at a frame frequency of input frame frequency×i Hz, which equals i times the input frame frequency, where “i” is a positive integer greater than 0. The input frame frequency is 60 Hz in the NTSC National Television Standards Committee system and 50 Hz in the PAL Phase-Alternating Line system.

The controller 200 generates signals so that pixels P can be driven at various refresh rates. Refresh rate may be defined as the number of frames transmitted per second. That is, the controller 200 generates signals related to the driving so that the pixels P can be driven at a variable refresh rate when operating in a variable refresh rate VRR mode. For example, the controller 200 can drive the pixels P at various refresh rates by simply changing the speed of the clock signal, generating a synchronization signal to create a horizontal blank or a vertical blank, or driving the gate driver 300 in a mask manner.

The voltage level of the gate control signal GCS output from the controller 200 may be supplied to the gate driver 300 after having been converted into a gate-on voltage and a gate-off voltage through a level shifter. The level shifter converts the low level voltage of the gate control signal GCS to a gate low voltage VGL and converts the high level voltage of the gate control signal GCS to a gate high voltage VGH. The gate control signal GCS includes a start pulse and a shift clock.

The gate driver 300 supplies a scan signal SC to the gate line GL according to the gate control signal GCS supplied from the controller 200. The gate driver 300 may be placed on one or both sides of the display panel 100 in a Gate In Panel (GIP) manner.

The gate driver 300 sequentially outputs gate signals to multiple gate lines GL under the control of the controller 200. The gate driver 300 may sequentially supply gate signals to the gate lines GL by shifting the gate signals with the use of a shift register.

The gate signal in an organic light-emitting display apparatus includes a scan signal SC and an emission control signal EM. The scan signal SC may include a scan pulse that swings between a gate low voltage VGL and a gate high voltage VGH. The emission control signal EM may include an emission control signal pulse that swings between a gate low voltage VGL and a gate high voltage VGH.

The gate driver 300 may include an emission control signal driver 310 and a scan driver 320. The emission control signal driver 310 outputs an emission control signal pulse in response to a start pulse and shift clock from the controller 200, and sequentially shifts the emission control signal pulse according to the shift clock. The scan driver 320 outputs a scan pulse in response to the start pulse and shift clock from the controller 200, and sequentially shifts the scan pulse according to the shift clock.

The data driver 400 converts image data RGB into data voltage V data according to a data control signal DCS supplied from the controller 200 and supplies the converted data voltage V data to the pixel P through the data line DL.

In FIG. 1, the data driver 400 is illustrated as being disposed on one side of the display panel 100 in one form, but the number and disposition positions of the data drivers 400 are not limited thereto. That is, the data driver 400 may be configured with a plurality of integrated circuits (ICs) and be disposed on one side of the display panel 100 in multiple separate sections.

The power supply unit 500 uses a DC-DC converter to generate DC power required to drive the pixel array of the display panel 100, the gate driver 300, and the data driver 400. The DC-DC converter may include a charge pump, a regulator, a buck converter, a boost converter, or the like. The power supply unit 500 may receive a DC input voltage applied from a host system and generate DC voltages such as a gate low voltage VGL, a gate high voltage VGH, a high-potential driving voltage ELVDD, and a low-potential driving voltage ELVSS. The gate low voltage VGL and the gate high voltage VGH may be supplied to a level shifter and the gate driver 300. The high-potential driving voltage ELVDD and the low-potential driving voltage ELVSS may be commonly supplied to the pixels P.

Additionally, the power supply unit 500 may generate DC voltages such as an initialization voltage Vini, a first voltage Va, a second voltage Vb, and an anode reset voltage. The initialization voltage Vini, the first voltage Va, the second voltage Vb, and the anode reset voltage are supplied to the pixel P through the power line VL. Here, the power line VL may include at least one voltage bus line transmitting an initialization voltage Vini, a first voltage Va, a second voltage Vb, and an anode reset voltage, respectively.

Figure 2:
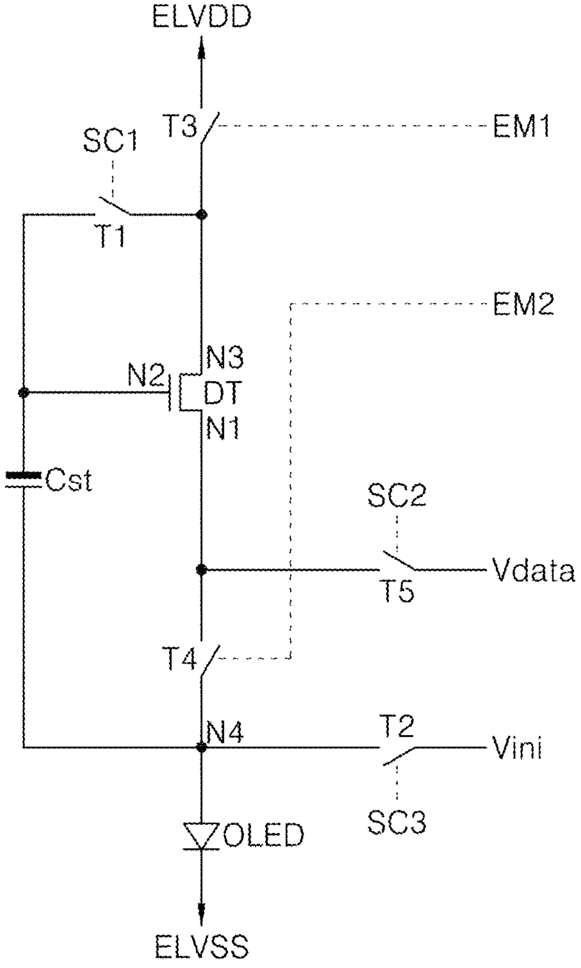
FIG. 2 is a circuit diagram illustrating a pixel circuit of a display apparatus according to a first embodiment of the present disclosure.

FIG. 2 is a circuit diagram illustrating a pixel circuit of a display apparatus according to a first embodiment of the present disclosure.

Referring to FIG. 2, the pixel circuit of the display apparatus according to the first embodiment includes a driving transistor DT, a storage capacitor Cst, a light-emitting element OLED, a first transistor T1, a second transistor T2, a third transistor T3, a fourth transistor T4, and a fifth transistor T5.

The driving transistor DT includes a first electrode corresponding to a first node N1, a gate electrode corresponding to a second node N2, and a second electrode corresponding to a third node N3. The first electrode may be a drain electrode of the driving transistor DT, and the second electrode may be a source electrode of the driving transistor DT. Alternatively, the first electrode may be the source electrode of the driving transistor DT, and the second electrode may be the drain electrode of the driving transistor DT.

The storage capacitor Cst is connected between the second node N2 of the driving transistor DT and a fourth node N4. Here, the fourth node N4 corresponds to the anode electrode of the light-emitting element OLED.

The light-emitting element OLED includes the anode electrode connected to the fourth node N4, and a cathode electrode connected to a low-potential driving voltage ELVSS.

The first transistor T1 is connected between the second node N2 and the third node N3 and connects or disconnects the second node N2 and the third node N3 in response to a first scan signal SC1.

The second transistor T2 is connected between the fourth node N4 and the initialization voltage Vini and applies the initialization voltage Vini to the fourth node N4 in response to a third scan signal SC3.

The third transistor T3 is connected between a high-potential driving voltage ELVDD and the third node N3 and applies the high-potential driving voltage ELVDD to the third node N3 in response to a first emission control signal EM1.

The fourth transistor T4 is connected between the first node N1 and the fourth node N4 and connects or disconnects the first node N1 and the fourth node N4 in response to a second emission control signal EM2.

The fifth transistor T5 is connected between the first node N1 and a data voltage V data and applies the data voltage V data to the first node N1 in response to a second scan signal SC2.

Figure 3:
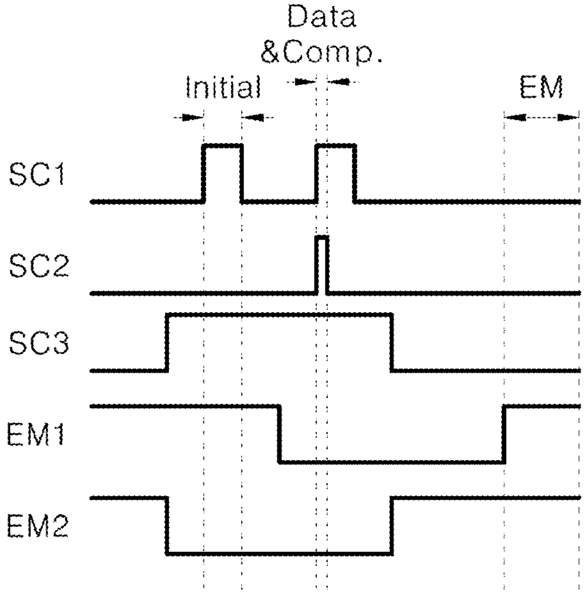
FIG. 3 is a timing diagram showing the operation of the pixel circuit of FIG. 2 according to an embodiment of the present disclosure.
Figure 4:
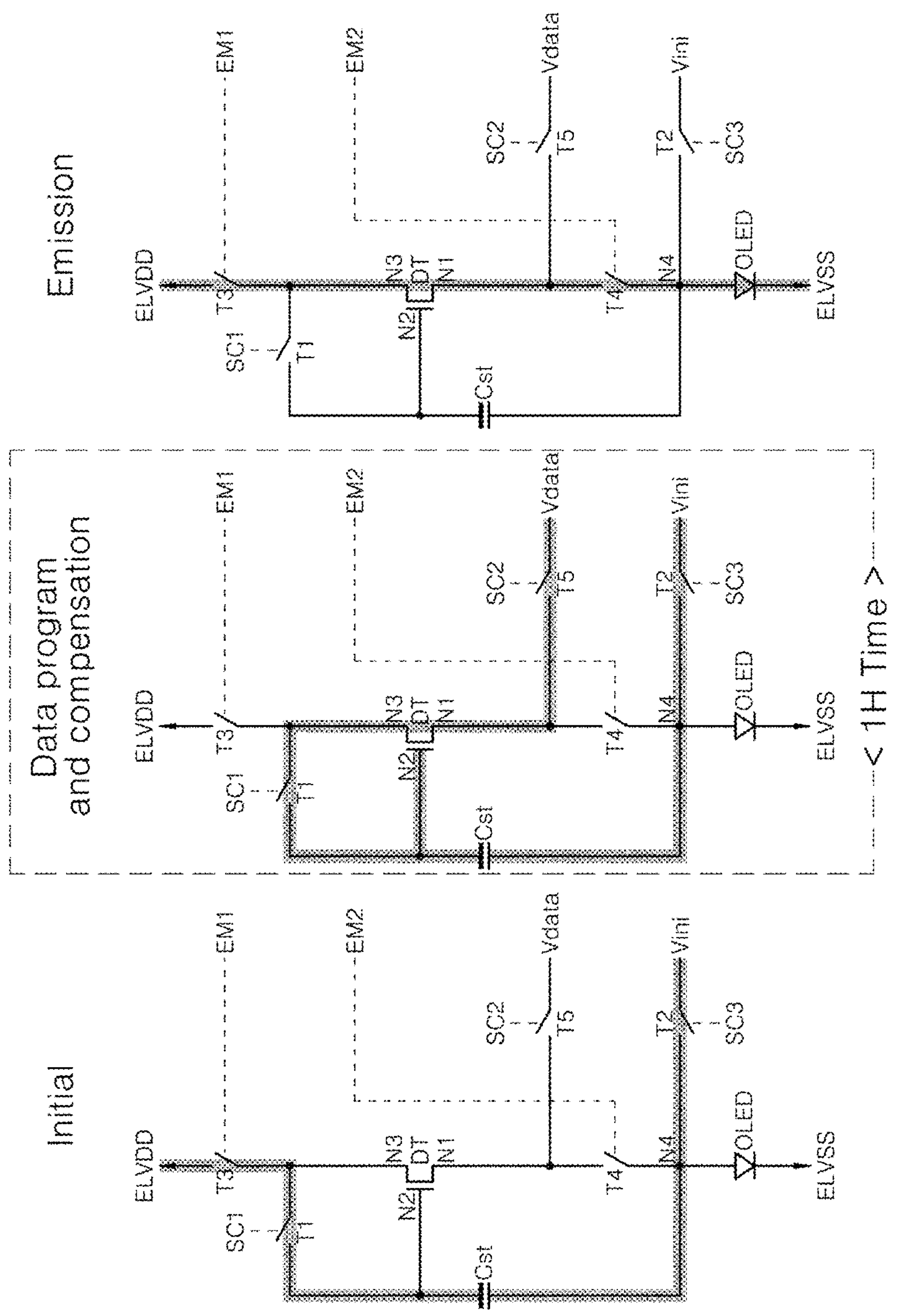
FIG. 4 is a circuit diagram showing the operation of the pixel circuit of FIG. 2 according to an embodiment of the present disclosure.

FIG. 3 is a timing diagram showing the operation of the pixel circuit of FIG. 2 according to one embodiment. FIG. 4 is a circuit diagram showing the operation of the pixel circuit of FIG. 2 according to one embodiment.

Referring to FIGS. 3 and 4, the display apparatus operates in following separate periods: an initialization period Initial, a data program and compensation period Data & Comp., and an emission period EM.

During the initialization period, the first transistor T1 connects the second node N2 and the third node N3 in response to a first scan signal SC1, and the third transistor T3 applies a high-potential driving voltage ELV DD to the third node N3 in response to a first emission control signal EM1. At this time, the high-potential driving voltage ELVDD is applied to one electrode of the storage capacitor Cst through the third node N3 and the first transistor T1. Additionally, the second transistor T2 applies an initialization voltage Vini to the fourth node N4 in response to the third scan signal SC3. At this time, the initialization voltage Vini is applied to the other electrode of the storage capacitor Cst and the anode electrode of the light-emitting element OLED through the fourth node N4. During the initialization period, both electrodes of the storage capacitor Cst and the anode electrode of the light-emitting element OLED are initialized.

During the data program and compensation period, the first transistor T1 connects the second node N2 and the third node N3 in response to the first scan signal SC1, and the fifth transistor T5 applies the data voltage V data to the first node N1 in response to the second scan signal SC2. At this time, the data voltage V data is applied to one electrode of the storage capacitor Cst through the diode connection of the driving transistor DT. Additionally, the second transistor T2 applies an initialization voltage Vini to the fourth node N4 in response to the third scan signal SC3. At this time, the initialization voltage Vini is applied to the other electrode of the storage capacitor Cst and the anode electrode of the light-emitting element OLED through the fourth node N4. In this operation of the data program and compensation period, the data voltage V data and the threshold voltage Vth of the driving transistor DT are applied to one electrode of the storage capacitor Cst, and the initialization voltage Vini is applied to the other electrode of the storage capacitor Cst. That is, "(data voltage V data+threshold voltage Vth)" is written to one electrode of the storage capacitor Cst, and "(data voltage V data+threshold voltage Vth-initialization voltage Vini)" is formed on both electrodes of the storage capacitor Cst.

During the emission period, the third transistor T3 applies a high-potential driving voltage ELVDD to the third node N3 in response to the first emission control signal EM1, and the fourth transistor T4 connects the first node N1 and the fourth node N4 in response to the second emission control signal EM2. During the emission period, a current path is formed between the high-potential driving voltage ELVDD and the low-potential driving voltage ELVDD through the third transistor T3, the driving transistor DT, and the fourth transistor T4, and the intensity of the current flowing in the current path is determined according to the magnitude of the data voltage V data programmed or sampled in the storage capacitor Cst.

However, in the pixel circuit of FIG. 2, if the voltage of the second node N2 is not completely settled during the data program and compensation period, "(data voltage V data+ threshold voltage Vth+error voltage Verror)" may be written to the storage capacitor Cst. This error voltage Verror may become greater when the mobility of the driving transistor DT is low and/or the compensation time is short. In the pixel circuit of FIG. 2, since the use of the data line to which the data voltage V data is applied is restricted to 1H time or less, the threshold voltage Vth compensation time may also be restricted to 1H time.

In order to reduce the error voltage V error, the threshold voltage Vth compensation time must be increased, but since the program time or sample time for the data voltage V data and the threshold voltage Vth compensation time are linked, it is not easy to reduce the error voltage V error except by improving the mobility of the driving transistor DT.

Accordingly, it is intended to provide a pixel circuit and a display apparatus including the same capable of minimizing or at least reducing compensation errors by compensating for electrical characteristics of pixels for a sufficient period of time. In addition, it is intended to provide a pixel circuit and a display apparatus including the same capable of separating a compensation period for compensating for electrical characteristics of pixels and a data program period for sampling a data voltage. In addition, it is intended to provide a pixel circuit and a display apparatus including the same capable of compensating for electrical characteristics of pixels using a voltage unrelated to the data voltage V data.

Figure 5:
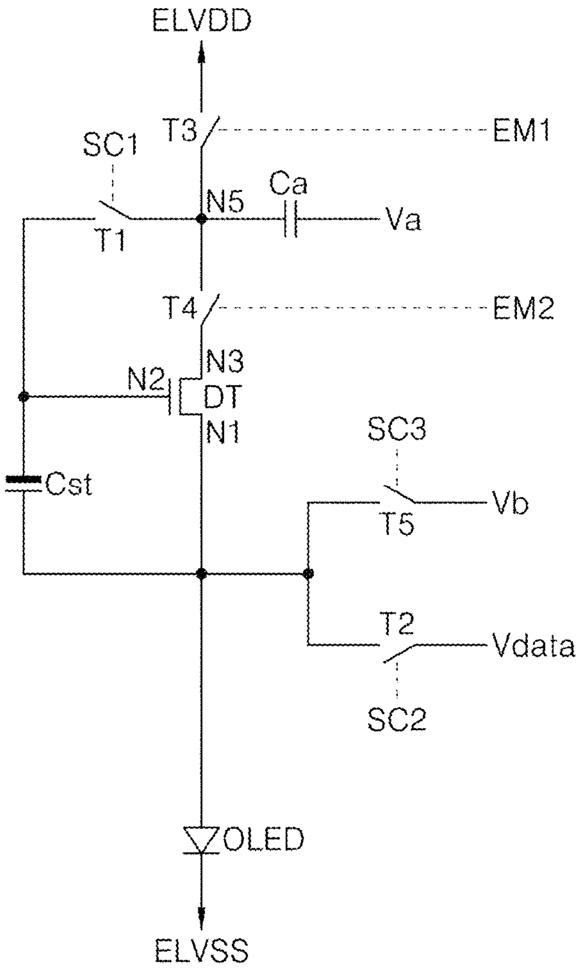
FIG. 5 is a circuit diagram illustrating a pixel circuit of a display apparatus according to a second embodiment of the present disclosure.

FIG. 5 is a circuit diagram illustrating a pixel circuit of a display apparatus according to a second embodiment of the present disclosure.

Referring to FIG. 5, the pixel circuit of the display apparatus according to the second embodiment includes a driving transistor DT, a storage capacitor Cst, a light-emitting element OLED, a compensation capacitor Ca, a first transistor T1, a second transistor T2, a third transistor T3, a fourth transistor T4, and a fifth transistor T5.

The driving transistor DT includes a first electrode corresponding to a first node N1, a gate electrode corresponding to a second node N2, and a second electrode corresponding to a third node N3. The first electrode and the second electrode may correspond to the drain electrode and source electrode of the driving transistor DT, respectively, or the source electrode and drain electrode thereof, respectively.

The storage capacitor Cst is connected between the second node N2 and the first node N1 of the driving transistor DT.

The light-emitting element OLED includes an anode electrode connected to the first node N1 and a cathode electrode connected to a low-potential driving voltage ELV SS.

The compensation capacitor Ca is connected between a fifth node N5 and a first voltage Va. One electrode of the compensation capacitor Ca is connected to the fifth node N5, and the other electrode of the compensation capacitor Ca is connected to the first voltage Va.

The first transistor T1 is connected between the second node N2 and the fifth node N5 and connects or disconnects the second node N2 and the fifth node N5 in response to a first scan signal SC1. Here, the fifth node N5 corresponds to one electrode of the compensation capacitor Ca.

The second transistor T2 is connected between the first node N1 and a data voltage V data and applies the data voltage V data to the first node N1 in response to a second scan signal SC2.

The third transistor T3 is connected between a high-potential driving voltage ELVDD and the fifth node N5 and applies the high-potential driving voltage ELVDD to the fifth node N5 in response to a first emission control signal EM1.

The fourth transistor T4 is connected between the fifth node N5 and the third node N3 and connects or disconnects the fifth node N5 and the third node N3 in response to a second emission control signal EM2.

The fifth transistor T5 is connected between the first node N1 and the second voltage Vb and applies the second voltage Vb to the first node N1 in response to the third scan signal SC3.

Figure 6:
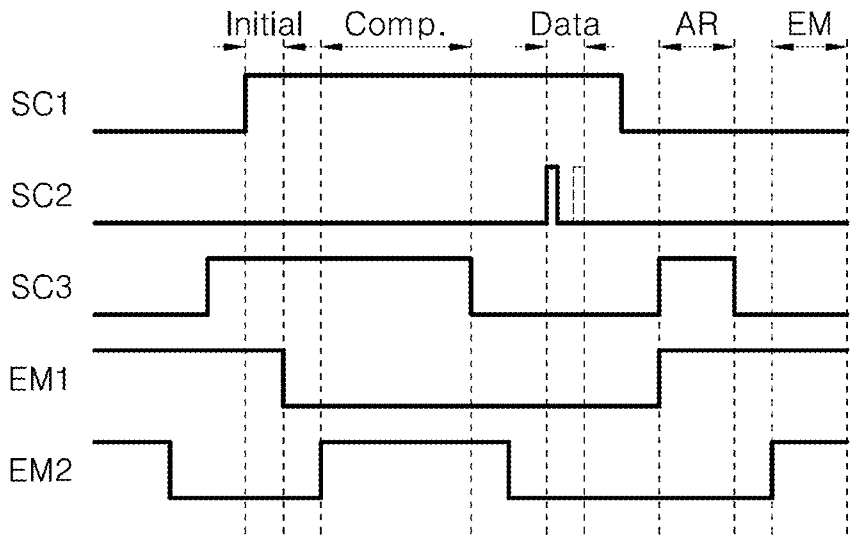
FIG. 6 is a timing diagram showing the operation of the pixel circuit of FIG. 5 according to an embodiment of the present disclosure.
Figure 7:
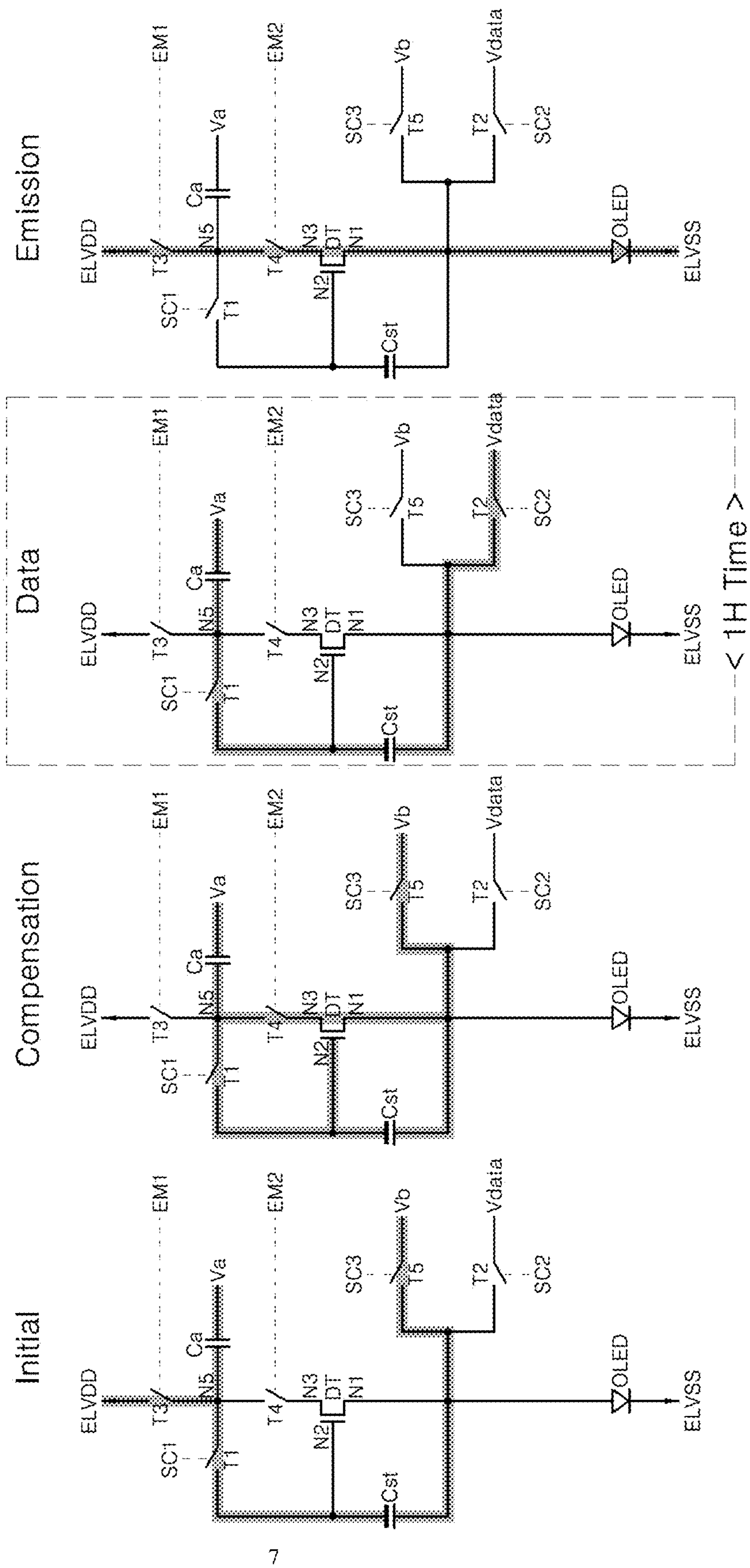
FIG. 7 is a circuit diagram showing an example of the operation of the pixel circuit of FIG. 5 according to an embodiment of the present disclosure.

FIG. 6 is a timing diagram showing the operation of the pixel circuit of FIG. 5 according to one embodiment. FIG. 7 is a circuit diagram showing an example of the operation of the pixel circuit of FIG. 5 according to one embodiment.

Referring to FIGS. 6 and 7, the display apparatus operates in following separate periods: an initialization period Initial, a compensation period Comp., a data program period Data, an anode reset period AR, and an emission period EM.

During the initialization period, the first transistor T1 connects the second node N2 and the fifth node N5 in response to the first scan signal SC1, and the third transistor T3 applies the high-potential driving voltage ELV DD to the fifth node N5 in response to the first emission control signal EM1. At this time, the high-potential driving voltage ELVDD is applied to one electrode of the compensation capacitor Ca through the fifth node N5, and the first voltage Va is applied to the other electrode of the compensation capacitor Ca. Additionally, the high-potential driving voltage ELVDD is applied to one electrode of the storage capacitor Cst through the fifth node N5 and the first transistor T1.

Additionally, the fifth transistor T5 applies the second voltage Vb to the other electrode of the storage capacitor Cst in response to the third scan signal SC3. At this time, the second voltage Vb is applied to the other electrode of the storage capacitor Cst and the anode electrode of the light-emitting element OLED. During the initialization period, one electrode of the storage capacitor Cst is initialized to the "(high-potential driving voltage ELVDD-first voltage Va)", and the other electrode of the storage capacitor Cst and the anode electrode of the light-emitting element OLED are initialized to the second voltage Vb.

During the compensation period, the first transistor T1 connects the second node N2 and the fifth node N5 in response to the first scan signal SC1, the fourth transistor T4 connects the fifth node N5 and the third node N3 in response to the second emission control signal EM2, and the fifth transistor T5 applies the second voltage Vb to the other electrode of the storage capacitor Cst in response to the third scan signal SC3. That is, the compensation period allows the driving transistor DT to be diode-connected through the first transistor T1 and the fourth transistor T4. At this time, the second voltage Vb is applied to one electrode of the compensation capacitor Ca and one electrode of the storage capacitor Cst through the diode connection of the driving transistor DT. The first voltage V a is applied to the other electrode of the compensation capacitor Ca. During the compensation period, the second voltage Vb and the threshold voltage Vth of the driving transistor DT are applied to one electrode of the storage capacitor Cst, and the second voltage Vb is applied to the other electrode of the storage capacitor Cst, so that the both electrodes of the storage capacitor Cst are maintained at a difference of potential equal to the threshold voltage Vth of the driving transistor.

During the data program period, the first transistor T1 connects the second node N2 and the fifth node N5 in response to the first scan signal SC1, and the second transistor T2 applies the data voltage V data to the other electrode of the storage capacitor Cst in response to the second scan signal SC2. That is, the data program period allows the fourth transistor T4 to be turned off and disconnect the diode-connection of the driving transistor DT. The threshold voltage Vth of the driving transistor DT is maintained at one electrode of the storage capacitor Cst through the compensation capacitor Ca. During the operation of this data program period, the data voltage V data is sampled on the storage capacitor Cst.

During the emission period, the third transistor T3 applies a high-potential driving voltage ELVDD to the fifth node N5 in response to the first emission control signal EM1, and the fourth transistor T4 connects the fifth node N5 and the third node N3 in response to the second emission control signal EM2. By the operation of this emission period, a current path is formed between the high-potential driving voltage ELVDD and the low-potential driving voltage ELVDD through the third transistor T3, the fourth transistor T4 and the driving transistor DT, and the intensity of the current flowing through the current path is determined according to the magnitude of the data voltage V data sampled on the storage capacitor Cst.

As described above, the pixel circuit of the display apparatus includes the first transistor T1 and the fourth transistor T4 which diode-connect the driving transistor DT and uses the second voltage Vb unrelated to the data voltage V data to compensate for the characteristics of the driving transistor. Additionally, the pixel circuit may include the compensation capacitor Ca having one side connected to the fifth node N5 and the other side connected to the first voltage Va so that the threshold voltage of the driving transistor DT is maintained.

Such a display apparatus can overcome the problematic situation in which the compensation time is restricted to 1H time by diode-connecting the driving transistor DT and compensating for the threshold voltage of the driving transistor DT with the use of the second voltage Vb that is independent of the data voltage V data.

In addition, the display apparatus can accurately compensate for the threshold voltage of the driving transistor DT because the threshold voltage of the driving transistor DT is maintained through the compensation capacitor Ca having the other electrode connected to the first voltage Va.

In addition, since the display apparatus operates in the data program period and the compensation period periods separately, a sufficiently long time period can be allotted to the compensation time for compensating for the threshold voltage characteristic of the driving transistor DT.

Additionally, the display apparatus can compensate for the threshold voltage of the driving transistor DT for a sufficient compensation time, thereby minimizing compensation error.

Figure 8:
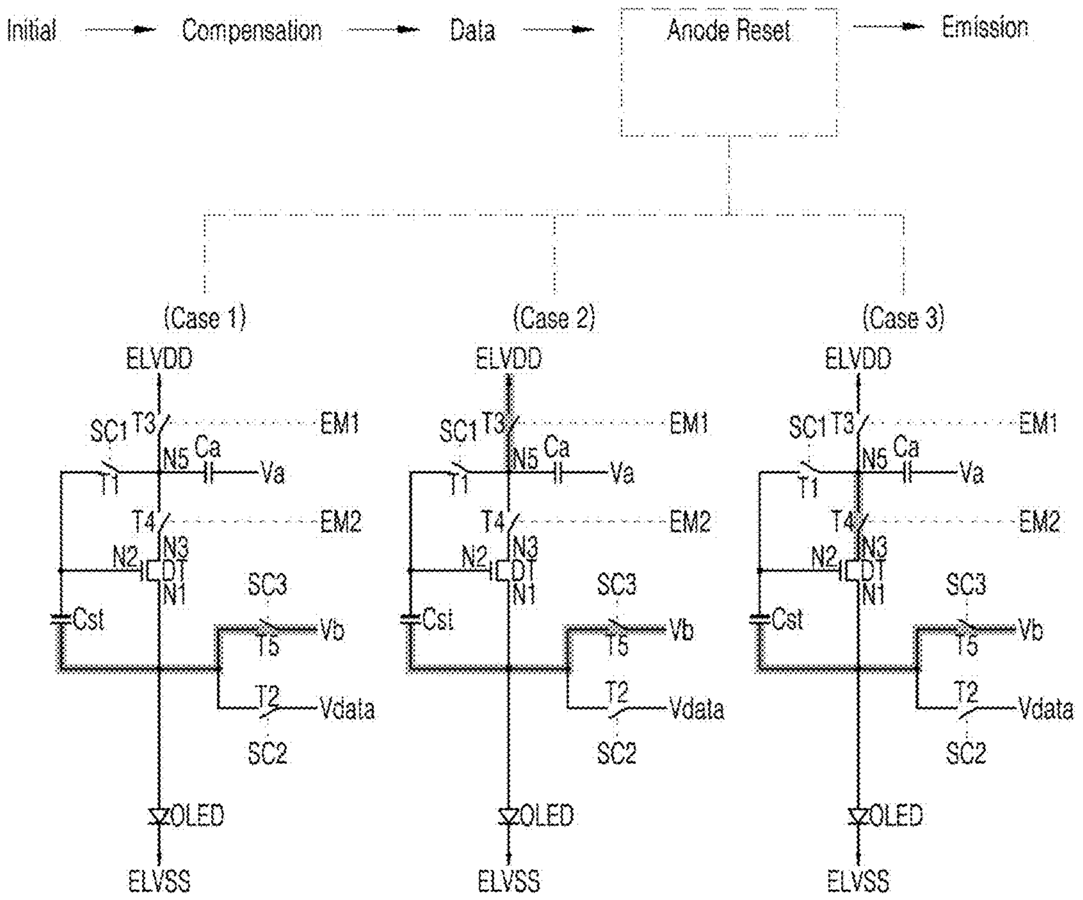
FIG. 8 is a circuit diagram showing another example of the operation of the pixel circuit of FIG. 5 according to an embodiment of the present disclosure.

FIG. 8 is a circuit diagram showing another example of the operation of the pixel circuit of FIG. 5 according to one embodiment. In the example, the initialization period, the compensation period, the data program period, and the emission period are substantially the same as those described with regard to FIG. 7, so the description thereof will be replaced with the description with regard to FIG. 7.

Referring to FIG. 8, the anode reset period may exist after the data program period and before the emission period.

During the anode reset period, as in Case 1, the fifth transistor T5 may apply the second voltage Vb to the other electrode of the storage capacitor Cst and the anode electrode of the light-emitting element OLED in response to the third scan signal SC3.

Alternatively, during the anode reset period, as in Case 2, the fifth transistor T5 may apply the second voltage Vb to the other electrode of the storage capacitor Cst and the anode electrode of the light-emitting element OLED in response to the third scan signal SC3, and the third transistor T3 may apply the high-potential driving voltage ELVDD to the fifth node N5 in response to the first emission control signal EM1.

Alternatively, during the anode reset period, as in Case 3, the fifth transistor T5 may apply the second voltage Vb to the other electrode of the storage capacitor Cst and the anode electrode of the light-emitting element OLED in response to the third scan signal SC3, the third transistor T3 may be turned off in response to the first emission control signal EM1, and the fourth transistor T4 may connect the fifth node N5 and the third node N3 in response to the second emission control signal EM2.

As described above, during the anode reset period, the anode electrode of the light-emitting element OLED and the other electrode of the storage capacitor Cst are connected to the second voltage Vb, and one electrode of the storage capacitor Cst is floated.

Thus, the display apparatus can use the second voltage Vb used for threshold voltage compensation of the driving transistor DT as the anode reset voltage. Such a display apparatus can reset the anode electrode of the light-emitting element and the storage capacitor with the use of the second voltage Vb used for threshold voltage compensation of the driving transistor DT, thereby removing the power wiring for the anode reset voltage.

Figure 9:
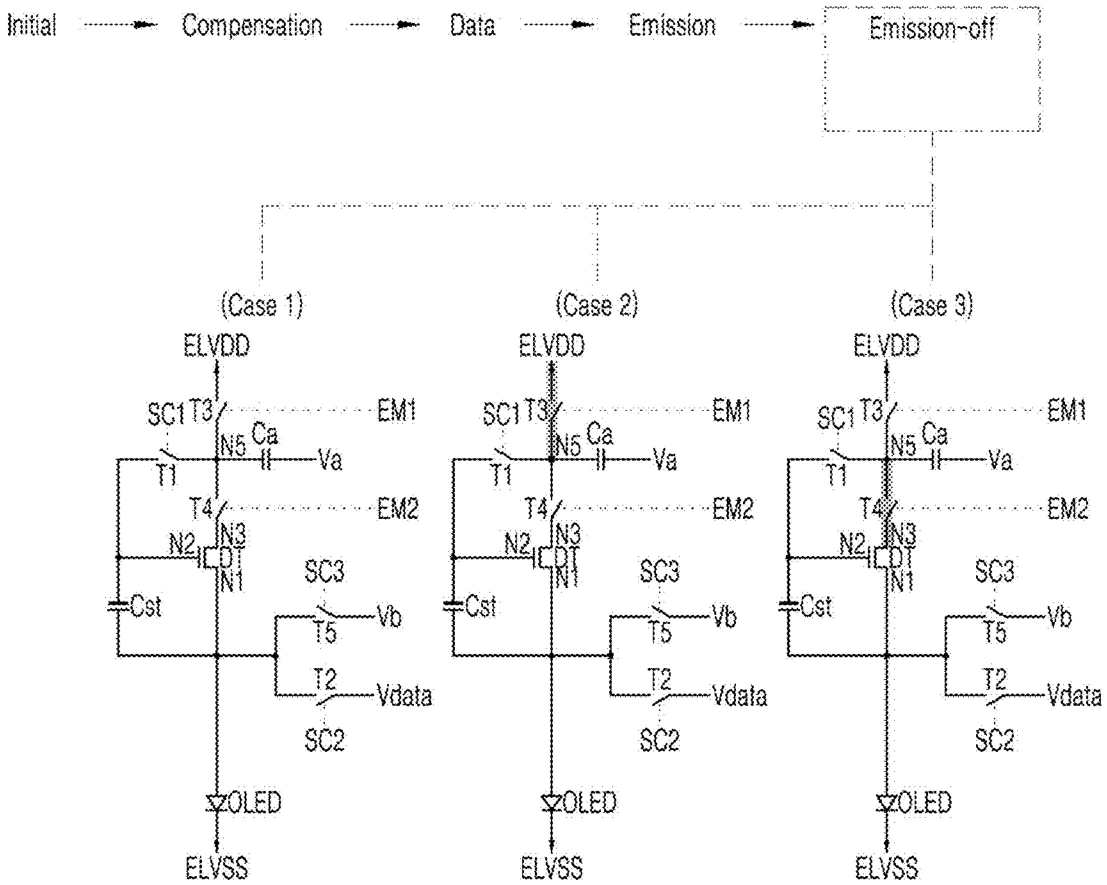
FIG. 9 is a circuit diagram showing still another example of the operation of the pixel circuit of FIG. 5 according to an embodiment of the present disclosure.

FIG. 9 is a circuit diagram showing still another example of the operation of the pixel circuit of FIG. 5 according to one embodiment. In the example, the initialization period, the compensation period, the data program period, and the emission period are substantially the same as those described with regard to FIG. 7, so the description thereof will be replaced with the description with regard to FIG. 7.

An emission-off period exists after the emission period. During the emission-off period, in Case 1, all of the first to fifth transistors T1 to T5 may be turned off.

Alternatively, during the emission-off period, as Case 2, the third transistor T3 may apply the high-potential driving voltage ELV DD to the fifth node in response to the first emission control signal EM1, and the remaining first, second, fourth, and fifth transistors T1, T2, T4, T5 may be turned off.

Alternatively, in the emission-off period, as in Case 3, the fourth transistor T4 may connect the fifth node N5 and the third node N3 in response to the second emission control signal EM2, and the remaining first, second, third, and fifth transistors T1, T2, T3, T5 may be turned off.

During the emission-off period, specific nodes through which the current path is formed are initialized, so that the next operation can be precisely controlled.

Figure 10:
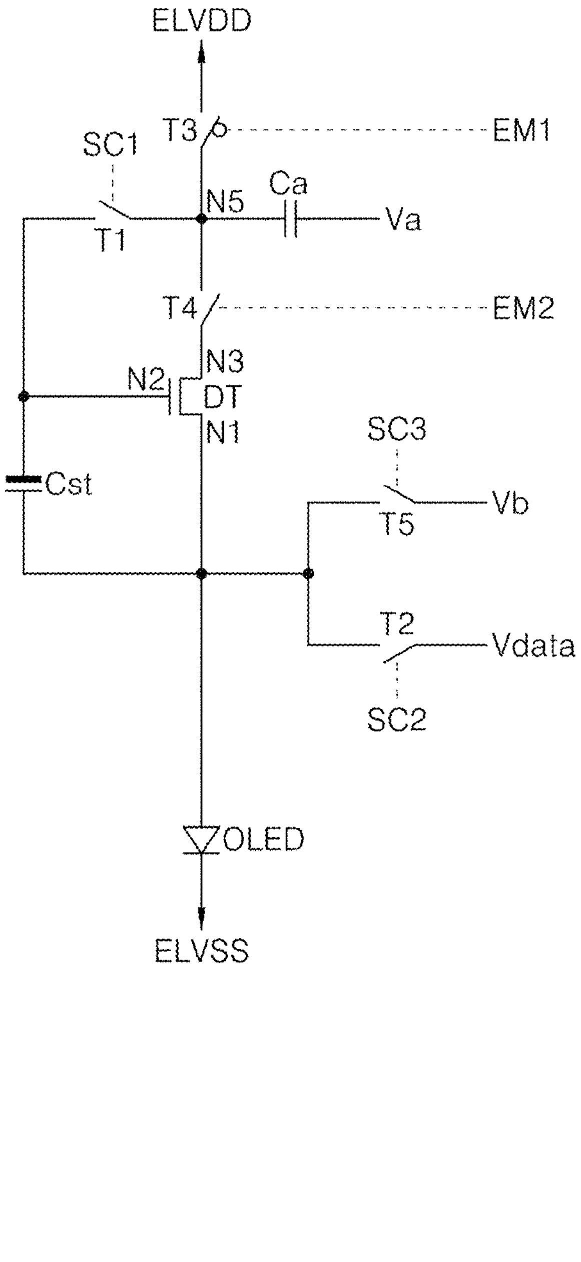
FIG. 10 is a circuit diagram illustrating a pixel circuit of a display apparatus according to a third embodiment of the present disclosure.

FIG. 10 is a circuit diagram illustrating a pixel circuit of a display apparatus according to a third embodiment of the present disclosure. Here, the same configuration and operation as in FIG. 5 will be replaced with the description with regard to FIG. 5.

Referring to FIG. 10, the third transistor T3 may be formed as a P-type thin film transistor, and the driving transistor DT, first, second, fourth, and fifth transistors T1, T2, T4, T5 may be formed as N-type transistors.

The first transistor T1 operates in response to the first scan signal SC1, the second transistor T2 operates in response to the second scan signal SC2, and the third transistor T3 operates in response to the first emission control signal EM1. The fourth transistor T4 operates in response to the second emission control signal EM2, and the fifth transistor T5 operates in response to the third scan signal SC3.

Figure 11:
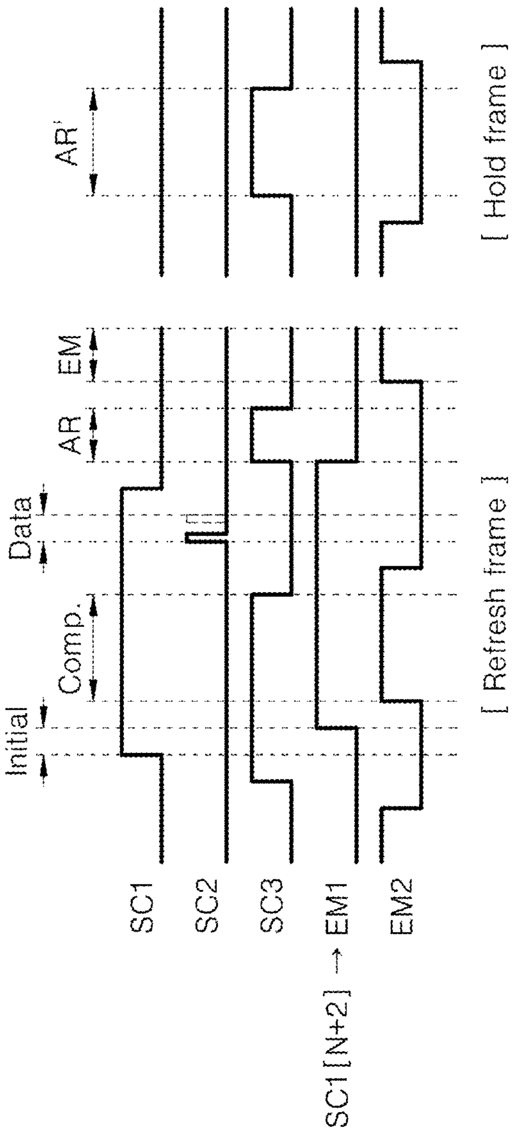
FIG. 11 is a timing diagram showing an example of the operation of the pixel circuit of FIG. 10 according to an embodiment of the present disclosure.
Figure 12:
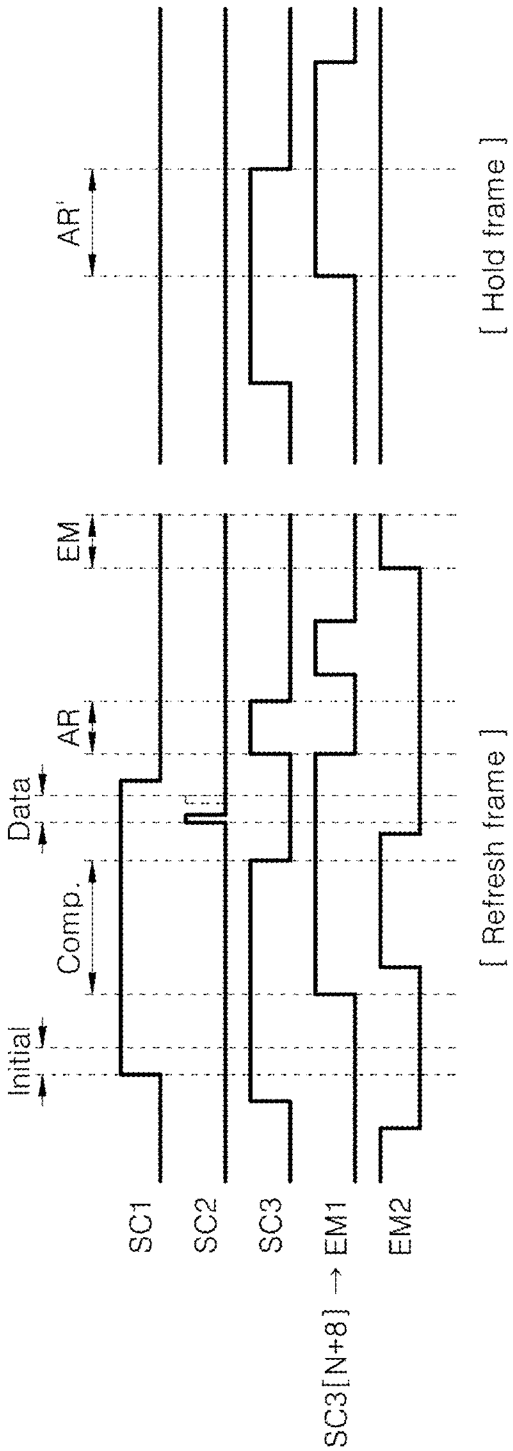
FIG. 12 is a timing diagram showing another example of the operation of the pixel circuit of FIG. 10 according to an embodiment of the present disclosure.
Figure 13:
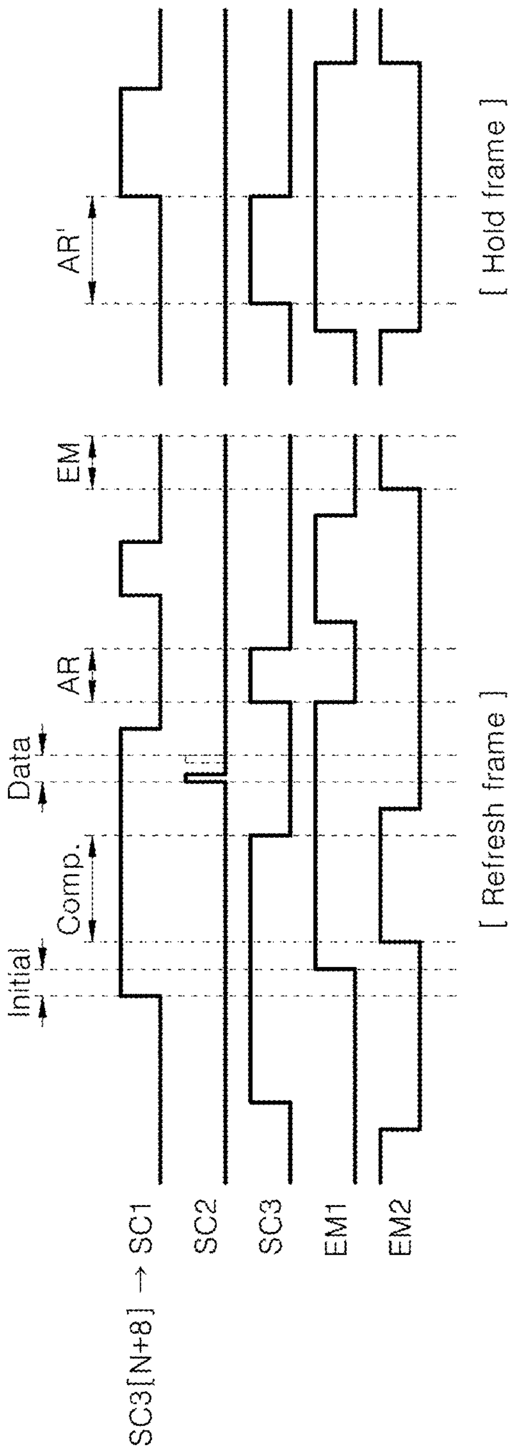
FIG. 13 is a timing diagram showing still another example of the operation of the pixel circuit of FIG. 10 according to an embodiment of the present disclosure.

As in the pixel circuit of FIG. 10, when the third transistor T3 is formed as a P-type thin film transistor, the number of the scan signals or the emission control signals can be reduced as in FIGS. 11, 12, and 13.

FIG. 11 is a timing diagram showing an example of the operation of the pixel circuit of FIG. 10 according to one embodiment. In the example, the description of the operations in the initialization period, the compensation period, the data program period, the anode reset period, and the emission period is replaced with the description with regard to FIGS. 6 to 8.

Referring to FIG. 11, the display apparatus can use a first scan signal SC1[N+2] following a first scan signal SC1[N] as the first emission control signal EM1 for use in the operation of the third transistor T3.

Since the display apparatus operates using the first scan signal SC1[N+2] instead of the first emission control signal EM1 during the initialization period, the anode reset period, and the emission period, the first emission control signal EM1 can be deleted. This can eliminate the emission control signal driver that generates the first emission control signal EM1, thereby reducing the width of the non-display area of the display panel.

FIG. 12 is a timing diagram showing another example of the operation of the pixel circuit of FIG. 10 according to one embodiment.

Referring to FIG. 12, the display apparatus can use a third scan signal SC3[N+8] following a third scan signal SC3[N] as the first emission control signal EM1.

Since the display apparatus operates using the third scan signal SC3[N+8] instead of the first emission control signal EM1 during the initialization period, the anode reset period, and the emission period, the first emission control signal EM1 can be deleted. This can eliminate the emission control signal driver that generates the first emission control signal EM1, thereby reducing the width of the non-display area of the display panel.

FIG. 13 is a timing diagram showing still another example of the operation of the pixel circuit of FIG. 10 according to one embodiment.

Referring to FIG. 13, the display apparatus can use a third scan signal SC3[N+8] following a third scan signal SC3[N] as the first scan signal SC1.

Since the display apparatus operates using the third scan signal SC3[N+8] instead of the first scan signal SC1 during the initialization period, the compensation period, and the data program period, the first scan signal SC1 can be deleted. This can eliminate the scan driver that generates the first scan signal SC1, thereby reducing the width of the non-display area of the display panel.

Additionally, referring to FIGS. 11 to 13, the display apparatus may operate in a VRR (Variable Refresh Rate) mode, and may be driven through a combination of refresh frames and hold frames. The VRR mode can allow a pixel to operate at a constant frequency, operate at an increased refresh rate updating the data voltage V data when the pixel is required to be driven at a high speed, or operate at a decreased refresh rate when the power consumption is required to be reduced or the pixel is required to be driven at a low speed.

The display apparatus may be driven through a combination of refresh frames and hold frames when the reduced power consumption is required or the low-speed driving is required. A combination of a refresh frame in which the data voltage V data is updated and a hold frame in which the data voltage V data is not updated may be repeated.

Figure 14:
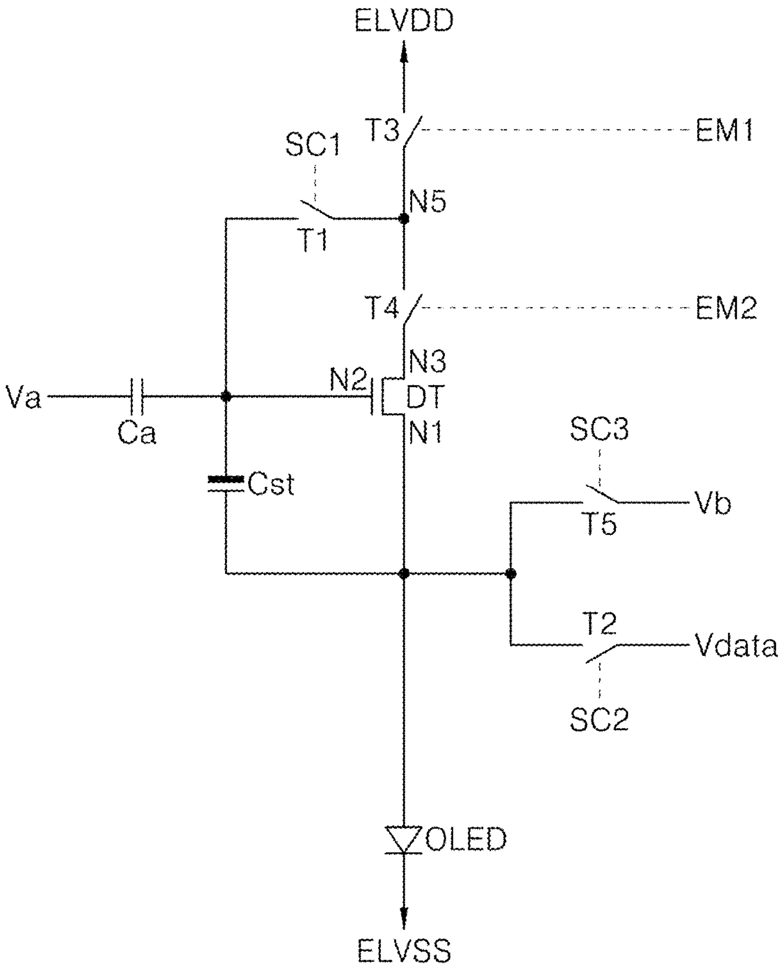
FIG. 14 is a circuit diagram illustrating a pixel circuit of a display apparatus according to a fourth embodiment of the present disclosure.

FIG. 14 is a circuit diagram illustrating a pixel circuit of a display apparatus according to a fourth embodiment of the present disclosure.

Referring to FIG. 14, the pixel circuit of the display apparatus according to the fourth embodiment includes a driving transistor DT, a storage capacitor Cst, a light-emitting element OLED, a compensation capacitor Ca, a first transistor T1, a second transistor T2, a third transistor T3, a fourth transistor T4, and a fifth transistor T5.

The driving transistor DT includes a first electrode corresponding to a first node N1, a gate electrode corresponding to a second node N2, and a second electrode corresponding to a third node N3. The first electrode and the second electrode may correspond to the drain electrode and source electrode of the driving transistor DT, respectively, or the source electrode and drain electrode thereof, respectively.

The storage capacitor Cst is connected between the second node N2 and the first node N1 of the driving transistor DT.

The light-emitting element OLED includes an anode electrode connected to the first node N1, and a cathode electrode connected to a low-potential driving voltage ELVSS.

The compensation capacitor Ca is connected between the second node N2 and a first voltage Va. One electrode of the compensation capacitor Ca is connected to the second node N2, and the other electrode of the compensation capacitor Ca is connected to the first voltage Va. One electrode of the compensation capacitor Ca is always connected to one electrode of the storage capacitor Cst.

The first transistor T1 is connected between the second node N2 and the fifth node N5 and connects or disconnects the second node N2 and the fifth node N5 in response to a first scan signal SC1. Here, the second node N2 corresponds to one electrode of the compensation capacitor Ca.

The second transistor T2 is connected between the first node N1 and a data voltage V data and applies the data voltage V data to the first node N1 in response to a second scan signal SC2.

The third transistor T3 is connected between a high-potential driving voltage ELVDD and the fifth node N5 and applies the high-potential driving voltage ELVDD to the fifth node N5 in response to a first emission control signal EM1.

The fourth transistor T4 is connected between the fifth node N5 and the third node N3 and connects or disconnects the fifth node N5 and the third node N3 in response to a second emission control signal EM2.

The fifth transistor T5 is connected between the first node N1 and the second voltage Vb and applies the second voltage Vb to the first node N1 in response to the third scan signal SC3.

In such a display apparatus, since one electrode of the compensation capacitor Ca is always connected to one electrode of the storage capacitor Cst, the threshold voltage of the driving transistor DT can be maintained at the storage capacitor Cst during the compensation period and the data program period, thereby accurately compensating for the threshold voltage of the driving transistor DT.

Additionally, according to some embodiments, the first voltage V a that maintains the other electrode of the compensation capacitor Ca at a constant voltage level may be set to the high-potential driving voltage ELVDD. Additionally, according to some embodiments, the first voltage Va may be set to the second voltage Vb. Since such a display apparatus uses the high-potential driving voltage ELVDD or the second voltage Vb as the first voltage Va, the number of the power wirings can be reduced.

Figure 15:
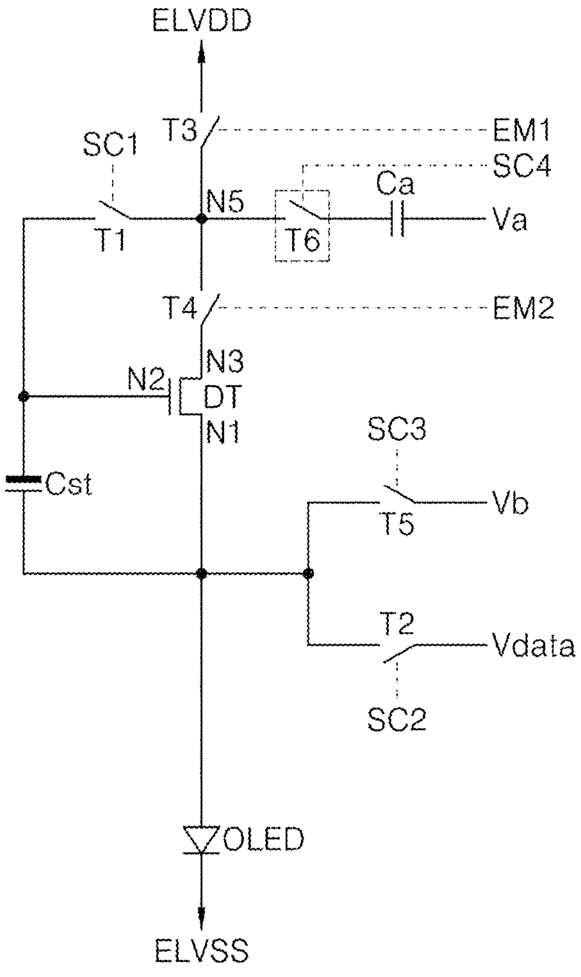
FIG. 15 is a circuit diagram illustrating a pixel circuit of a display apparatus according to a fifth embodiment of the present disclosure.

FIG. 15 is a circuit diagram illustrating a pixel circuit of a display apparatus according to a fifth embodiment of the present disclosure. Here, the description with regard to the same configuration and operation as in FIG. 5 will be replaced with the description with regard to FIG. 5.

Referring to FIG. 15, a sixth transistor T6 is further included between the fifth node N5 and the compensation capacitor Ca. The sixth transistor T6 connects or disconnects the fifth node N5 and one electrode of the compensation capacitor Ca in response to the fourth scan signal SC4. The sixth transistor T6 is turned on during the initialization period, the compensation period, and the data program period to connect the fifth node N5 and one electrode of the compensation capacitor Ca. The sixth transistor T6 is turned off during periods of time other than the initialization period, the compensation period, and the data program period to disconnect the fifth node N5 and one electrode of the compensation capacitor Ca. The other electrode of the compensation capacitor Ca is floated during the turned-off state of the sixth transistor T6.

Since this sixth transistor T6 is turned off during periods of time other than the initialization period, the compensation period, and the data program period, the influence of the compensation capacitor Ca, for example, on the current path formed during the emission period can be prevented.

Figure 16:
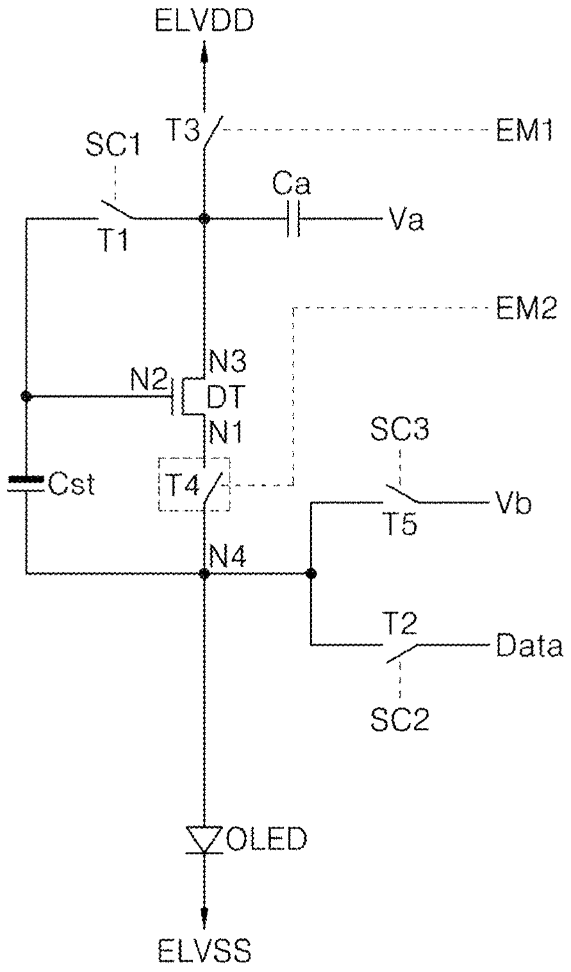
FIG. 16 is a circuit diagram illustrating a pixel circuit of a display apparatus according to a sixth embodiment of the present disclosure.

FIG. 16 is a circuit diagram illustrating a pixel circuit of a display apparatus according to a sixth embodiment of the present disclosure.

Referring to FIG. 16, the pixel circuit of the display apparatus according to the sixth embodiment includes a driving transistor DT, a storage capacitor Cst, a light-emitting element OLED, a compensation capacitor Ca, a first transistor T1, a second transistor T2, a third transistor T3, a fourth transistor T4, and a fifth transistor T5.

The driving transistor DT includes a first electrode corresponding to a first node N1, a gate electrode corresponding to a second node N2, and a second electrode corresponding to a third node N3. The first electrode and the second electrode may correspond to the drain electrode and source electrode of the driving transistor DT, respectively, or the source electrode and drain electrode thereof, respectively.

The storage capacitor Cst is connected between the second node N2 of the driving transistor DT and a fourth node N4. Here, the fourth node N4 corresponds to the anode electrode of the light-emitting element OLED.

The light-emitting element OLED includes the anode electrode connected to the fourth node N4, and a cathode electrode connected to a low-potential driving voltage ELVSS.

The compensation capacitor Ca is connected between a third node N3 and a first voltage Va. One electrode of the compensation capacitor Ca is connected to the third node N3, and the other electrode of the compensation capacitor Ca is connected to the first voltage Va.

The first transistor T1 is connected between the second node N2 and the third node N3 and connects or disconnects the second node N2 and the third node N3 in response to a first scan signal SC1.

The second transistor T2 is connected between the fourth node N4 and a data voltage V data and applies the data voltage V data to the fourth node N4 in response to a second scan signal SC2.

The third transistor T3 is connected between a high-potential driving voltage ELVDD and the third node N3 and applies the high-potential driving voltage ELVDD to the third node N3 in response to a first emission control signal EM1.

The fourth transistor T4 is connected between the first node N1 and the fourth node N4 and connects or disconnects the first node N1 and the fourth node N4 in response to a second emission control signal EM2.

The fifth transistor T5 is connected between the fourth node N4 and a second voltage Vb and applies the second voltage Vb to the fourth node N4 in response to a third scan signal SC3.

This pixel circuit of the display apparatus operates in the initialization period, the compensation period, the data program period, and the emission period separately.

During the initialization period, the high-potential driving voltage ELVDD is applied to one electrode of the storage capacitor Cst and one electrode of the compensation capacitor Ca, and the second voltage Vb is applied to the other electrode of the storage capacitor Cst and the anode electrode of the light-emitting element OLED.

During the compensation period, the first node N1 and the fourth node N4 are connected through the fourth transistor T4, the driving transistor D2 is diode-connected through the first transistor T1 and the fourth transistor T4, and the second voltage Vb is applied to the other electrode of the storage capacitor Cst, and is applied to one electrode of the storage capacitor Cst and one electrode of the compensation capacitor Ca through the fourth transistor T4, the driving transistor DT and the first transistor T1. Since the second voltage Vb is applied to the other electrode of the storage capacitor Cst, and the second voltage Vb and the threshold voltage of the driving transistor DT are applied to one electrode of the storage capacitor Cst, both electrodes of the storage capacitor Cst have a difference equal to the threshold voltage of the driving transistor DT.

During the data program period, the diode connection of the driving transistor DT is disconnected by the fourth transistor T4, and the data voltage V data is applied to the other electrode of the storage capacitor Cst. At this time, one electrode of the storage capacitor Cst is maintained at the level of the threshold voltage of the driving transistor DT through the compensation capacitor Ca.

Since this display apparatus diode-connects the driving transistor DT through the fourth transistor T4 and the first transistor T1 and compensates for the threshold voltage of the driving transistor DT with the use of the second voltage Vb unrelated to the data voltage, a sufficient period of time can be utilized to compensate for the threshold voltage of the driving transistor DT. In addition, the display apparatus can accurately compensate for the threshold voltage of the driving transistor DT because the threshold voltage of the driving transistor DT is maintained through the compensation capacitor Ca during the compensation period and the data program period.

As describe above, since the display apparatus operates in the data program period and the compensation period which are divided into two separate periods, a sufficiently long time period can be allotted to the compensation time for compensating for the threshold voltage characteristic of the driving transistor DT, thereby minimizing compensation error even when the mobility of the driving transistor DT is low.

Figure 17:
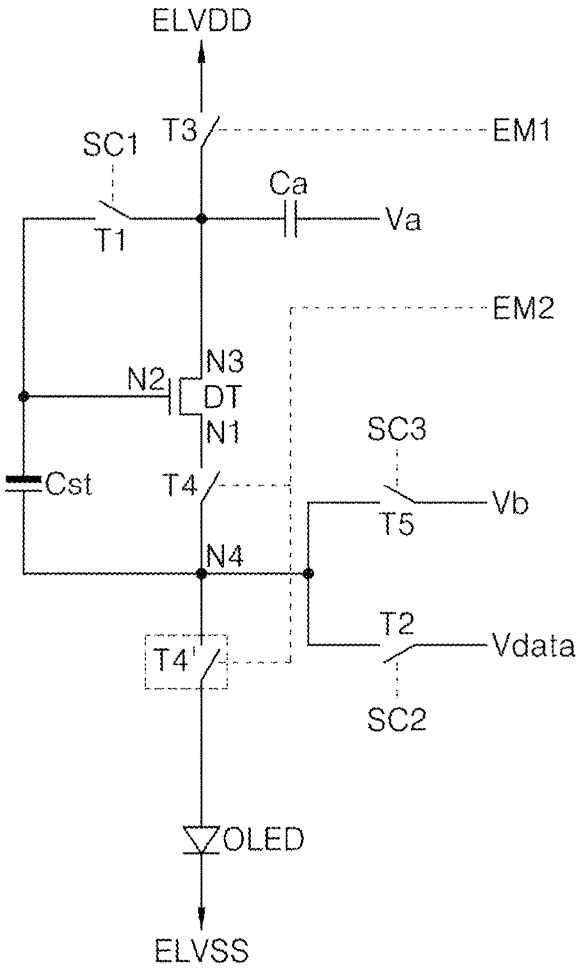
FIG. 17 is a circuit diagram illustrating a pixel circuit of a display apparatus according to a seventh embodiment of the present disclosure.

FIG. 17 is a circuit diagram illustrating a pixel circuit of a display apparatus according to a seventh embodiment of the present disclosure. Here, the description with regard to the same configuration and operation as in FIG. 16 will be replaced with the description with regard to FIG. 16.

Referring to FIG. 17, the pixel circuit of the display apparatus further includes a sub-fourth transistor T4' between the fourth node N4 and the anode electrode of the light-emitting element OLED. The fourth transistor T4 and the sub-fourth transistor T4' operate in response to the same second emission control signal EM2.

The sub-fourth transistor T4' is turned off during the initialization period and the data program period.

The sub-fourth transistor T4' is turned off during the initialization period to prevent the second voltage Vb from being applied to the anode electrode of the light-emitting element OLED, and during the data program period to prevent the data voltage V data from being applied to the anode electrode of the light-emitting element OLED. Through this, the sub-transistor T4' can prevent the light-emitting element OLED from emitting light by the second voltage Vb and the data voltage V data during the initialization period and the data program period.

Figure 18:
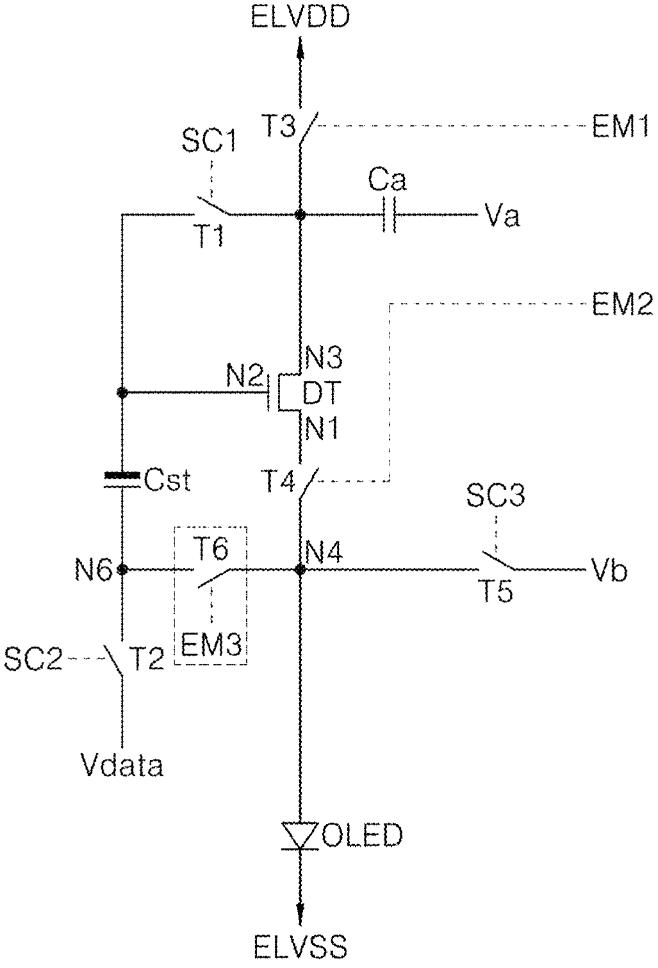
FIG. 18 is a circuit diagram illustrating a pixel circuit of a display apparatus according to an eighth embodiment of the present disclosure.

FIG. 18 is a circuit diagram illustrating a pixel circuit of a display apparatus according to an eighth embodiment of the present disclosure.

Referring to FIG. 18, the pixel circuit of the display apparatus according to the eighth embodiment includes a driving transistor DT, a storage capacitor Cst, a light-emitting element OLED, a compensation capacitor Ca, a first transistor T1, a second transistor T2, a third transistor T3, a fourth transistor T4, a fifth transistor T5, and a sixth transistor T6.

The driving transistor DT includes a first electrode corresponding to a first node N1, a gate electrode corresponding to a second node N2, and a second electrode corresponding to a third node N3.

The storage capacitor Cst has one electrode connected to the second node N2 of the driving transistor DT and the other electrode connected to a sixth node N6. Here, the sixth node N6 corresponds to the other electrode of the storage capacitor Cst.

The light-emitting element OLED includes the anode electrode connected to the fourth node N4, and a cathode electrode connected to a low-potential driving voltage ELVSS.

The compensation capacitor Ca is connected between a third node N3 and a first voltage Va. One electrode of the compensation capacitor Ca is connected to the third node N3, and the other electrode of the compensation capacitor Ca is connected to the first voltage Va.

The first transistor T1 is connected between the second node N2 and the third node N3 and connects or disconnects the second node N2 and the third node N3 in response to a first scan signal SC1.

The second transistor T2 is connected between the sixth node N6 and a data voltage V data and applies the data voltage V data to the sixth node N6 in response to a second scan signal SC2.

The third transistor T3 is connected between a high-potential driving voltage ELVDD and the third node N3 and applies the high-potential driving voltage ELVDD to the third node N3 in response to a first emission control signal EM1.

The fourth transistor T4 is connected between the first node N1 and the fourth node N4 and connects or disconnects the first node N1 and the fourth node N4 in response to a second emission control signal EM2.

The fifth transistor T5 is connected between the fourth node N4 and a second voltage Vb and applies the second voltage Vb to the fourth node N4 in response to a third scan signal SC3.

The sixth transistor T6 is connected between the sixth node N6 and the fourth node N4 and connects or disconnects the sixth node N6 and the fourth node N4 in response to a third emission control signal EM2. The sixth transistor T6 is turned off during the data program period. The sixth transistor T6 is turned off during the data program period to prevent the data voltage V data from being applied to the anode electrode of the light-emitting element OLED. Through this, the sixth transistor T6 can prevent the light-emitting element OLED from emitting light during the data program period.

Figure 19:
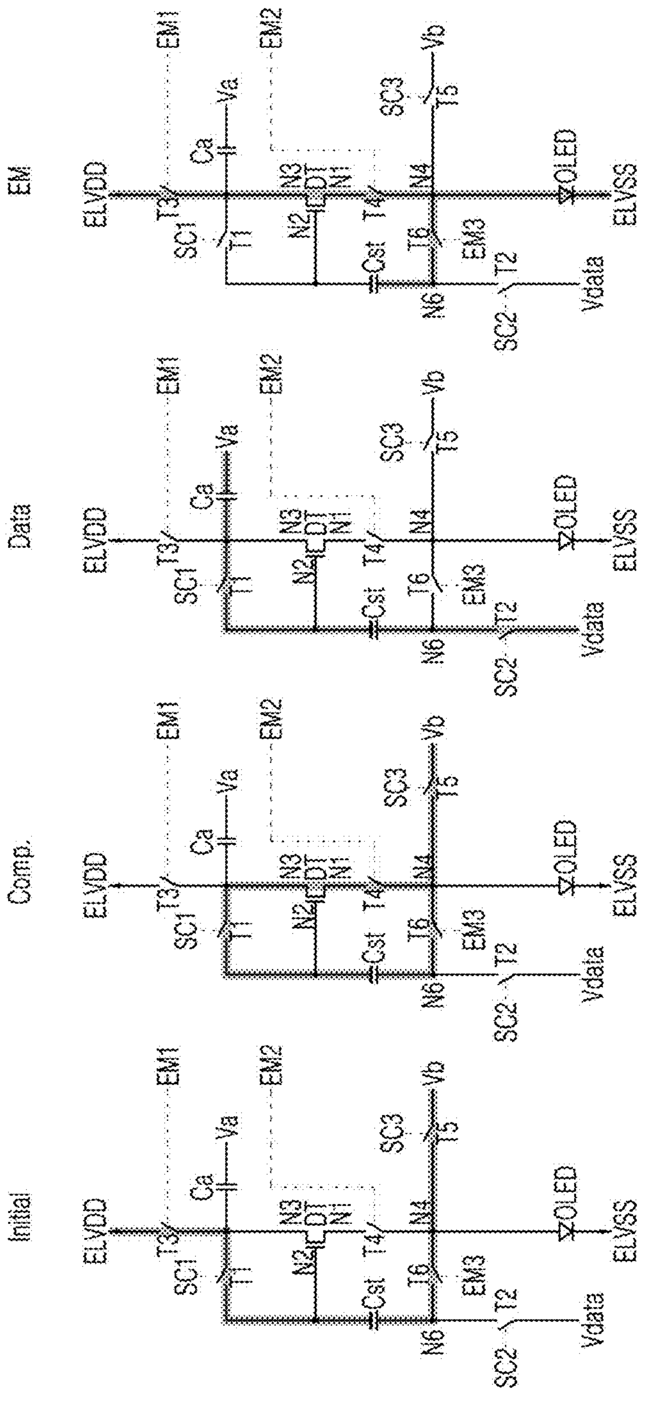
FIG. 19 is a circuit diagram showing an example of the operation of the pixel circuit of FIG. 18 according to an embodiment of the present disclosure.

FIG. 19 is a circuit diagram showing an example of the operation of the pixel circuit of FIG. 18 according to one embodiment.

Referring to FIGS. 18 and 19, the display apparatus operates in the initialization period, the compensation period, the data program period, and the emission period separately.

During the initialization period, the first transistor T1 connects the second node N2 and the third node N3 in response to a first scan signal SC1, and the third transistor T3 applies a high-potential driving voltage ELV DD to the third node N3 in response to a first emission control signal EM1. At this time, the high-potential driving voltage ELVDD is applied to one electrode of the compensation capacitor Ca through the third node N3, and the first voltage Va is applied to the other electrode of the compensation capacitor Ca. Additionally, the high-potential driving voltage ELVDD is applied to one electrode of the storage capacitor Cst through the third node N3 and the first transistor T1. Additionally, the fifth transistor T5 applies the second voltage Vb to the fourth node N4 in response to a third scan signal SC3, and the sixth transistor T6 connects the sixth node N6 and the fourth node N4 in response to a third emission control signal EM3. At this time, the second voltage Vb is applied to the other electrode of the storage capacitor Cst and the anode electrode of the light-emitting element OL ED through the fifth transistor T5 and the sixth transistor T6. During the initialization period, both electrodes of the storage capacitor Cst and the anode electrode of the light-emitting element OLED are initialized.

During the compensation period, the first transistor T1 connects the second node N2 and the third node N3 in response to the first scan signal SC1, the fifth transistor T5 applies the second voltage Vb to the fourth node N4 in response to the third scan signal SC3, and the sixth transistor T6 connects the sixth node N6 and the fourth node N4 in response to the third emission control signal EM3. At this time, the second voltage Vb is applied to one electrode of the compensation capacitor Ca and one electrode of the storage capacitor Cst through the diode connection of the driving transistor DT. Additionally, the second voltage Vb is applied to the other electrode of the storage capacitor Cst through the fifth transistor T5 and the sixth transistor T6. During the compensation period, the second voltage Vb and the threshold voltage Vth of the driving transistor DT are applied to one electrode of the storage capacitor Cst, and the second voltage Vb is applied to the other electrode of the storage capacitor Cst, so that both electrodes of the storage capacitor Cst are maintained at a difference of potential equal to the threshold voltage Vth of the driving transistor.

During the data program period, the first transistor T1 connects the second node N2 and the third node N3 in response to the first scan signal SC1, the second transistor T2 applies the data voltage V data to the sixth node N6 in response to the second scan signal SC2, and the sixth transistor T6 disconnects the sixth node N6 and the fourth node N4 in response to the third emission control signal EM3. During the data program period, the threshold voltage of the driving transistor DT is maintained at one electrode of the storage capacitor Cst through the compensation capacitor Ca, and the data voltage V data is sampled to the storage capacitor Cst.

During the emission period, the third transistor T3 applies a high-potential driving voltage ELVDD to the third node N3 in response to the first emission control signal EM1, and the fourth transistor T4 connects the first node N1 and the fourth node N4 in response to the second emission control signal EM2. Additionally, the sixth transistor T6 is turned on to connect the fourth node N4 to the other electrode of the storage capacitor Cst through the sixth node N6. During the emission period, a current path is formed between the high-potential driving voltage ELVDD and the low-potential driving voltage ELV DD through the third transistor T3, the driving transistor DT, and the fourth transistor T4.

As described above, since the display apparatus operates in the data program period and the compensation period which are divided into two separate periods, a sufficiently long time period can be allotted to the compensation time for compensating for the threshold voltage characteristic of the driving transistor DT. In addition, the display apparatus compensates for the threshold voltage of the driving transistor DT with the use of the second voltage Vb unrelated to the data voltage, thereby solving the problem of the compensation time being restricted to 1H time. In addition, the display apparatus can accurately compensate for the threshold voltage of the driving transistor DT because the threshold voltage of the driving transistor DT is maintained through the compensation capacitor Ca during the data program period.

In addition, by preventing the data voltage V data from being applied to the anode electrode of the light-emitting element OLED through the sixth transistor T6 during the data program period, the display apparatus can accurately sample the data voltage V data, and can prevent the light-emitting element OLED from emitting light during an unwanted period.

Figure 20:
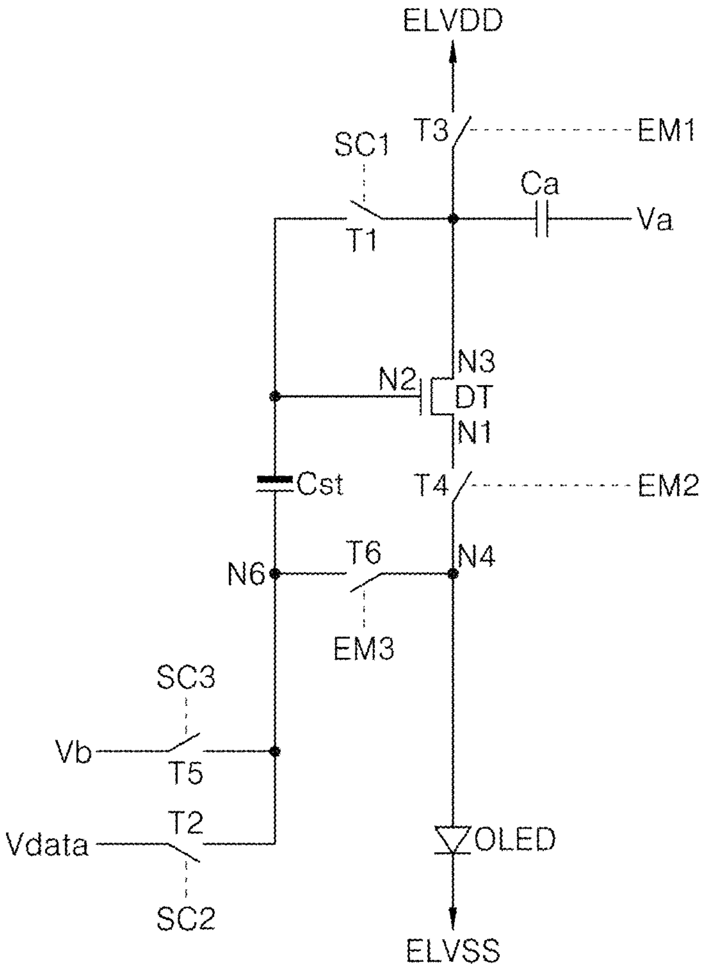
FIG. 20 is a circuit diagram illustrating a pixel circuit of a display apparatus according to a ninth embodiment of the present disclosure.
Figure 21:
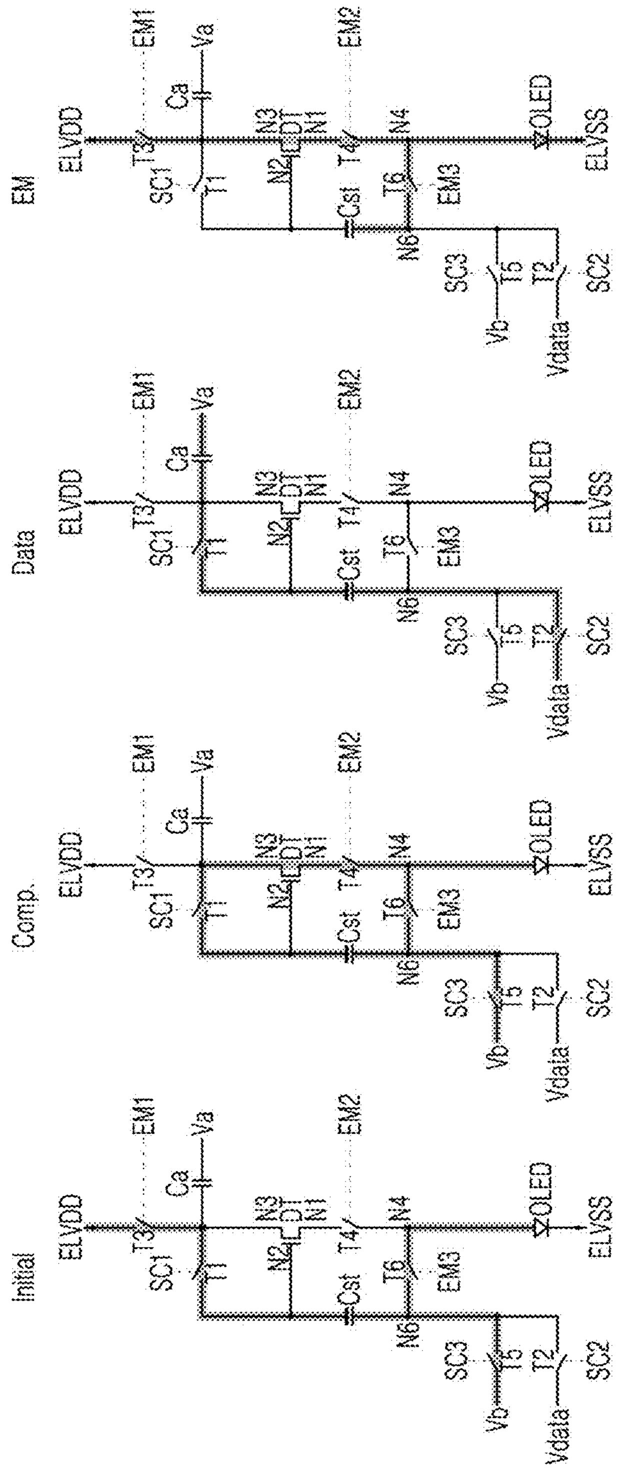
FIG. 21 is a circuit diagram showing an example of the operation of the pixel circuit of FIG. 20 according to an embodiment of the present disclosure.

FIG. 20 is a circuit diagram illustrating a pixel circuit of a display apparatus according to a ninth embodiment of the present disclosure. FIG. 21 is a circuit diagram showing an example of the operation of the pixel circuit of FIG. 20 according to one embodiment. Here, the description with regard to the same configuration and operation as in FIGS. 18 and 19 will be replaced with the descriptions with regard to FIGS. 18 and 19.

Referring to FIGS. 20 and 21, a fifth transistor T5 is connected between a sixth node N6 and a second voltage Vb. The fifth transistor T5 applies the second voltage Vb to the sixth node N6 in response to a third scan signal SC3. The sixth node N6 corresponds to the other electrode of a storage capacitor Cst.

During the initialization period, the fifth transistor T5 applies the second voltage Vb to the sixth node N6, and the second voltage Vb is applied to the other electrode of the storage capacitor Cst through the sixth node N6 and to the anode electrode of the light-emitting element OLED through a sixth transistor T6. In this way, the other electrode of the storage capacitor Cst and the anode electrode of the light-emitting element OLED are initialized with the second voltage Vb applied through the fifth transistor T5 and the sixth transistor T6 to them.

During the compensation period, the fifth transistor T5 applies the second voltage Vb to one electrode of the storage capacitor Cst through a driving transistor DT diode-connected by a first transistor T1 and applies the second voltage Vb to the other electrode of the storage capacitor Cst. Through this, both electrodes of the storage capacitor Cst maintain a difference equal to the threshold voltage of the driving transistor DT.

Description of the data program period and the emission period is replaced with the description with regard to FIG. 19.

Figure 22:
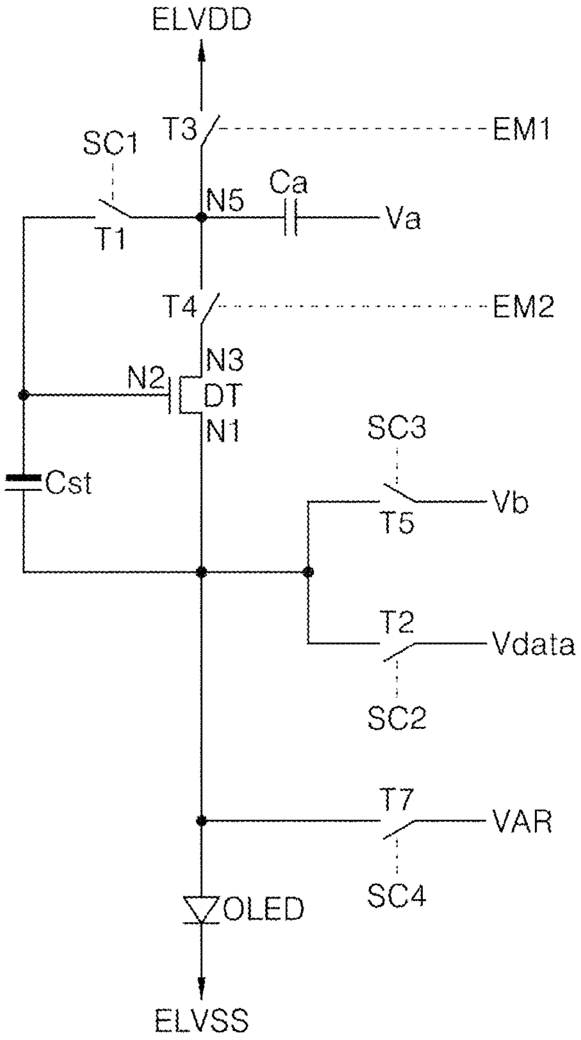
FIG. 22 is a circuit diagram illustrating a pixel circuit of a display apparatus according to a tenth embodiment of the present disclosure.
Figure 23:
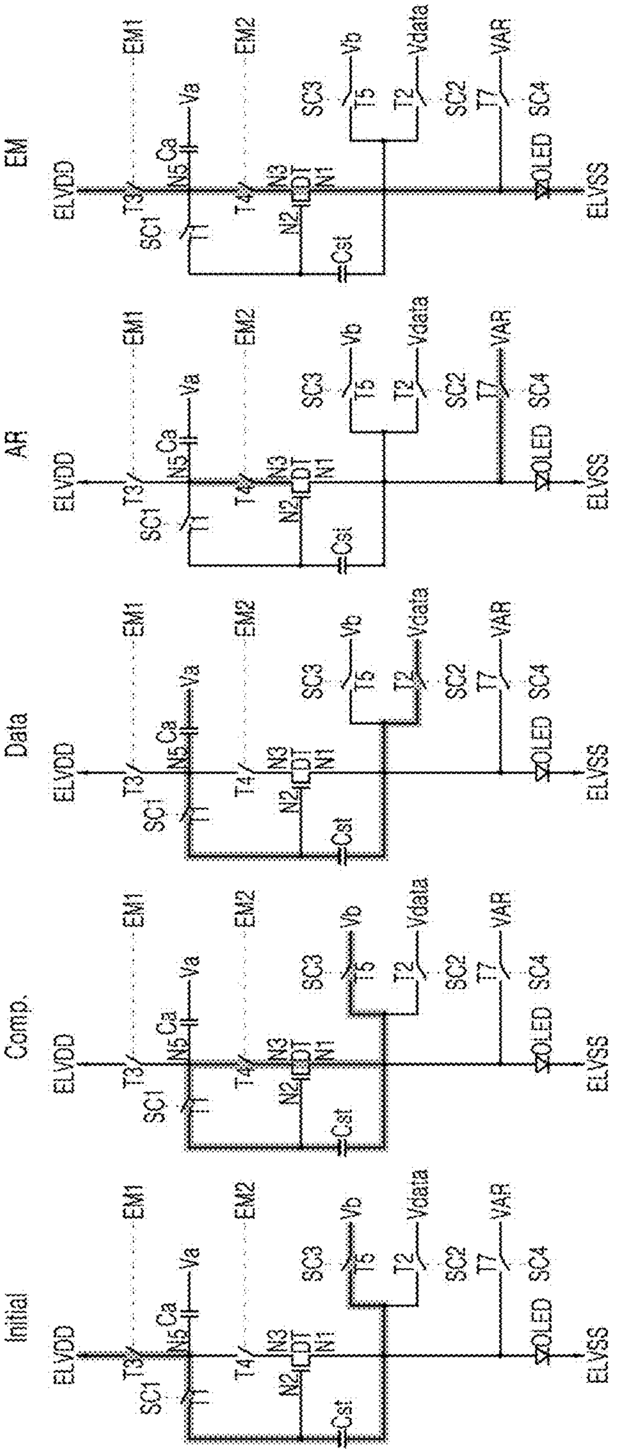
FIG. 23 is a circuit diagram showing an example of the operation of the pixel circuit of FIG. 22 according to an embodiment of the present disclosure.

FIG. 22 is a circuit diagram illustrating a pixel circuit of a display apparatus according to a tenth embodiment of the present disclosure. FIG. 23 is a circuit diagram showing an example of the operation of the pixel circuit of FIG. 22 according to one embodiment. Here, the description with regard to the same configuration and operation as in FIGS. 5 and 7 will be replaced with the descriptions with regard to FIGS. 5 and 7.

Referring to FIGS. 22 and 23, the pixel circuit of the display apparatus further includes a seventh transistor T7.

The seventh transistor T7 is connected between a first node N1 and an anode reset voltage VAR. The seventh transistor T7 applies the anode reset voltage VAR to the first node N1 in response to a fourth scan signal SC4.

During the anode reset period, the seventh transistor T7 applies the anode reset voltage VAR to the anode electrode of a light-emitting element OLED through the first node N1. Additionally, a fourth transistor T4 connects a fifth node N5 and a third node N3 in response to a second emission control signal EM2. As described above, during the anode reset period prior to the emission period, the anode electrode of the light-emitting element OLED is initialized to the anode reset voltage VAR.

Figure 24:
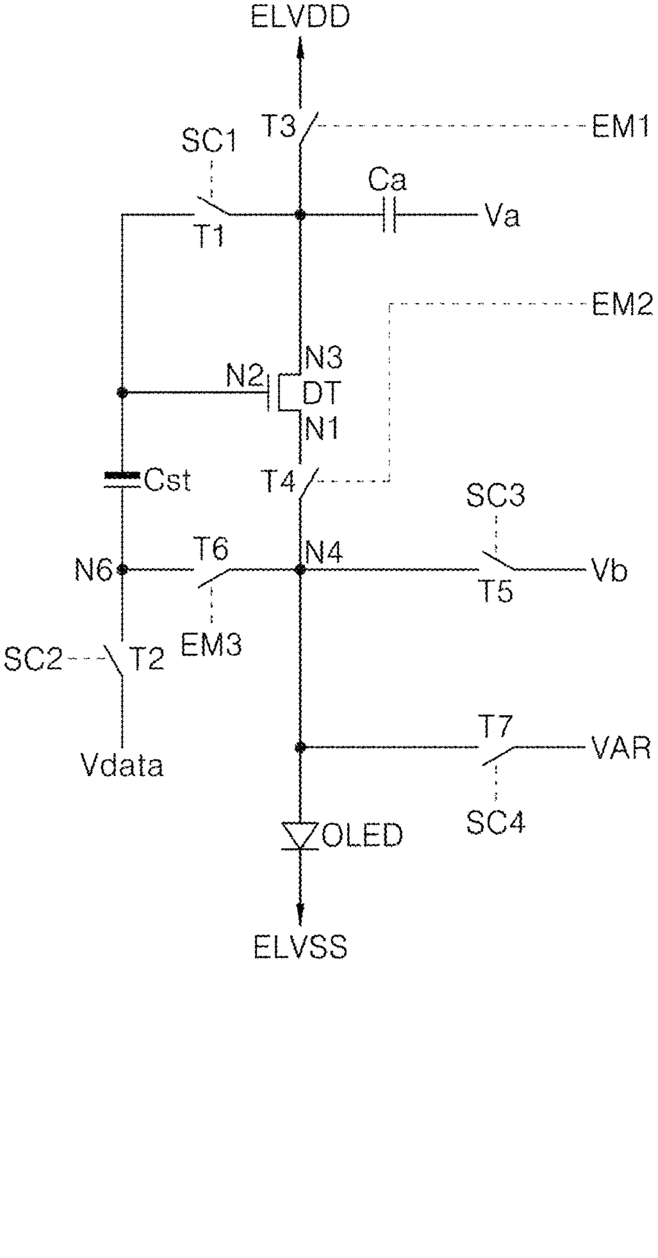
FIG. 24 is a circuit diagram illustrating a pixel circuit of a display apparatus according to an eleventh embodiment of the present disclosure.
Figure 25:
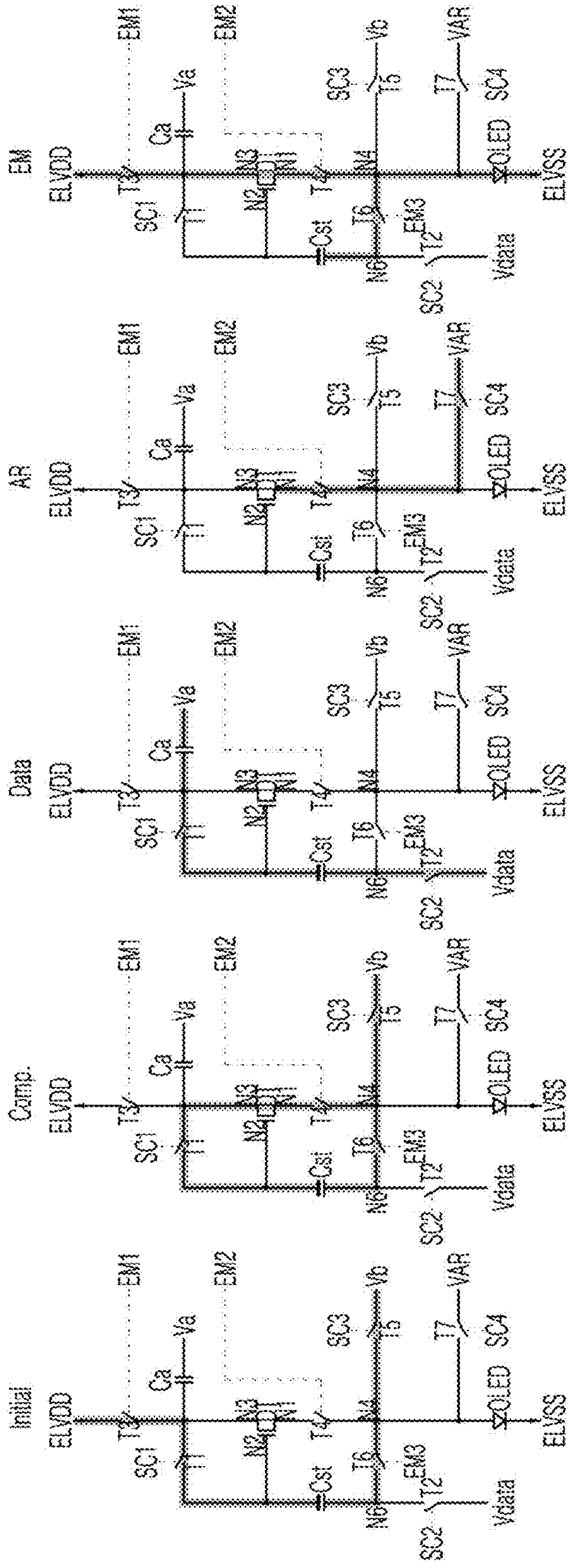
FIG. 25 is a circuit diagram showing an example of the operation of the pixel circuit of FIG. 24 according to an embodiment of the present disclosure.

FIG. 24 is a circuit diagram illustrating a pixel circuit of a display apparatus according to an eleventh embodiment of the present disclosure. FIG. 25 is a circuit diagram showing an example of the operation of the pixel circuit of FIG. 24 according to one embodiment. Here, the description with regard to the same configuration and operation as in FIGS. 18 and 19 will be replaced with the descriptions with regard to FIGS. 18 and 19.

Referring to FIGS. 24 and 25, the pixel circuit of the display apparatus further includes a seventh transistor T7. The seventh transistor T7 is connected between a fourth node N4 and an anode reset voltage VAR. The seventh transistor T7 applies the anode reset voltage VAR to the fourth node N4 in response to a fourth scan signal SC4.

During the anode reset period, the seventh transistor T7 applies the anode reset voltage VAR to the anode electrode of a light-emitting element OLED through the fourth node N4. Additionally, a fourth transistor T4 connects a first node N1 and a fourth node N4 in response to a second emission control signal EM2. As described above, during the anode reset period prior to the emission period, the anode electrode of the light-emitting element OLED and the first electrode of the driving transistor DT are initialized to the anode reset voltage VAR.

Figure 26:
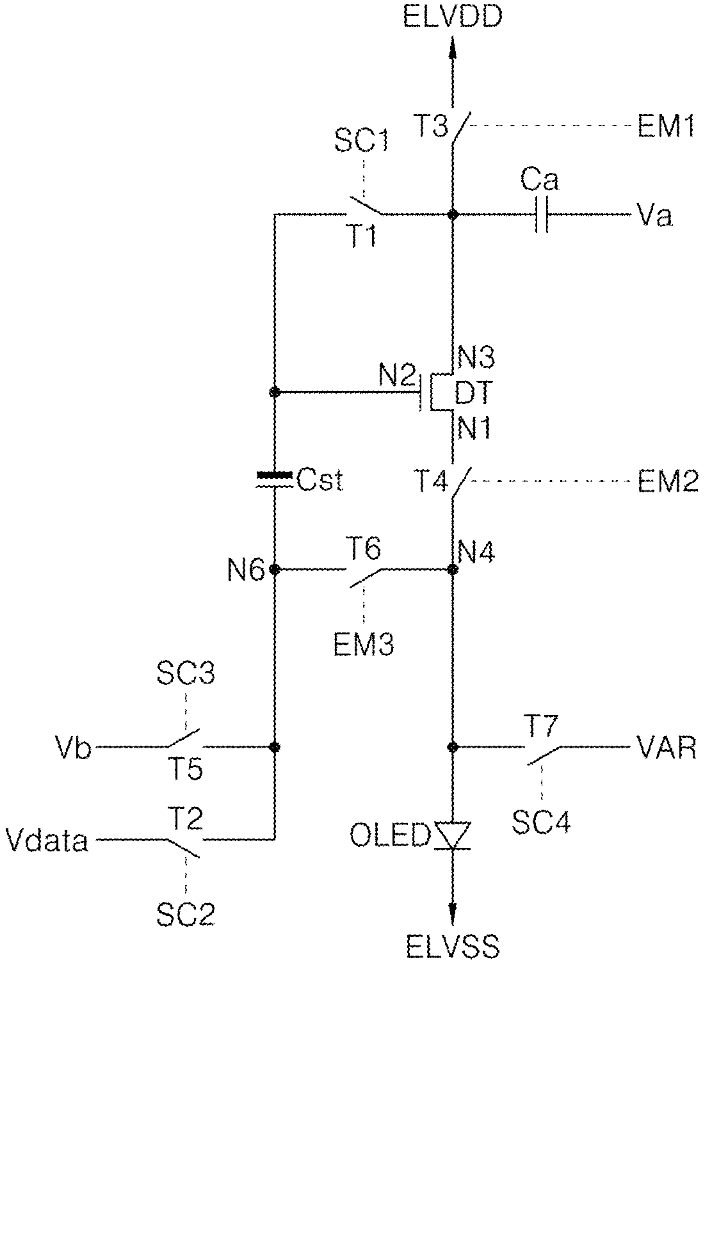
FIG. 26 is a circuit diagram illustrating a pixel circuit of a display apparatus according to a twelfth embodiment of the present disclosure.
Figure 27:
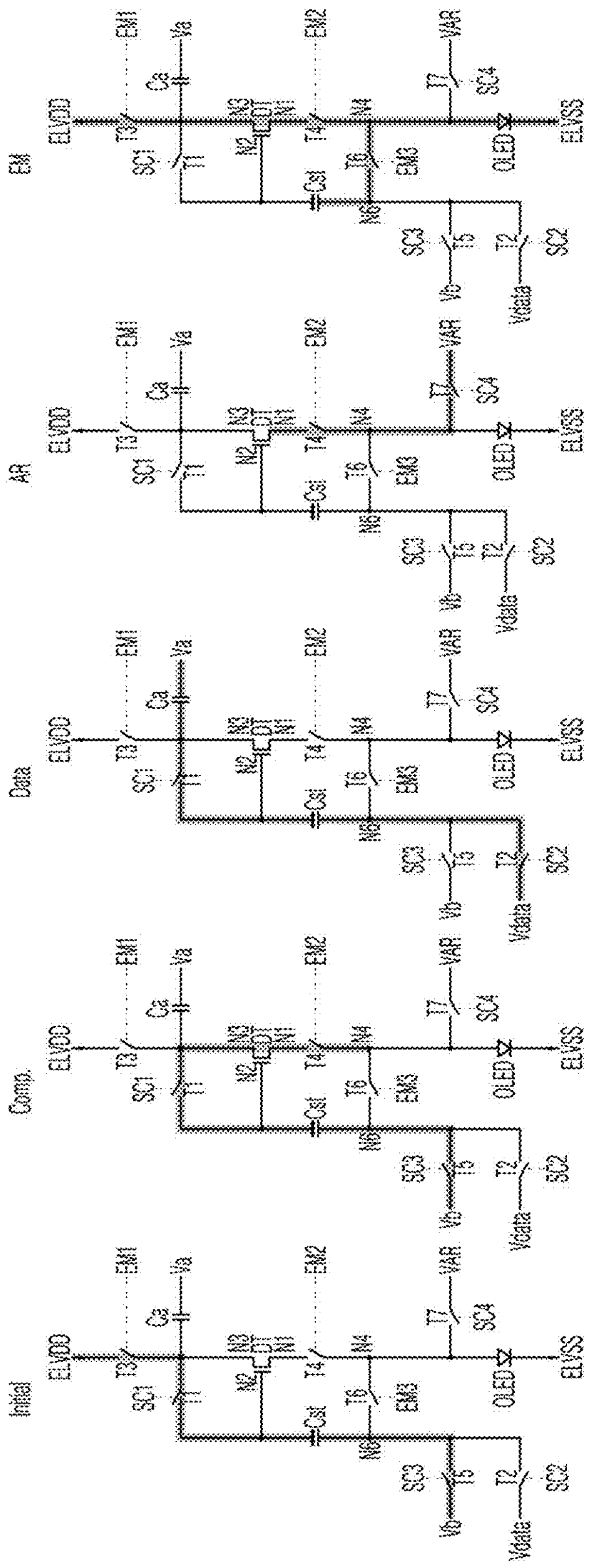
FIG. 27 is a circuit diagram showing an example of the operation of the pixel circuit of FIG. 26 according to an embodiment of the present disclosure.

FIG. 26 is a circuit diagram illustrating a pixel circuit of a display apparatus according to a twelfth embodiment of the present disclosure. FIG. 27 is a circuit diagram showing an example of the operation of the pixel circuit of FIG. 26 according to one embodiment. Here, the description with regard to the same configuration and operation as in FIGS. 20 and 21 will be replaced with the descriptions with regard to FIGS. 20 and 21.

Referring to FIGS. 26 and 27, the pixel circuit of the display apparatus further includes a seventh transistor T7. The seventh transistor T7 is connected between a fourth node N4 and an anode reset voltage VAR. The seventh transistor T7 applies the anode reset voltage VAR to the fourth node N4 in response to a fourth scan signal SC4. Additionally, the fourth transistor T4 is turned on to connect the first node N1 and the fourth node N4.

During the anode reset period, the seventh transistor T7 applies the anode reset voltage VAR to the anode electrode of a light-emitting element OLED through the fourth node N4. Additionally, a fourth transistor T4 connects a first node N1 and a fourth node N4 in response to a second emission control signal EM2. As described above, during the anode reset period prior to the emission period, the anode electrode of the light-emitting element OLED and the first electrode of the driving transistor DT are initialized to the anode reset voltage VAR.

Figure 28:
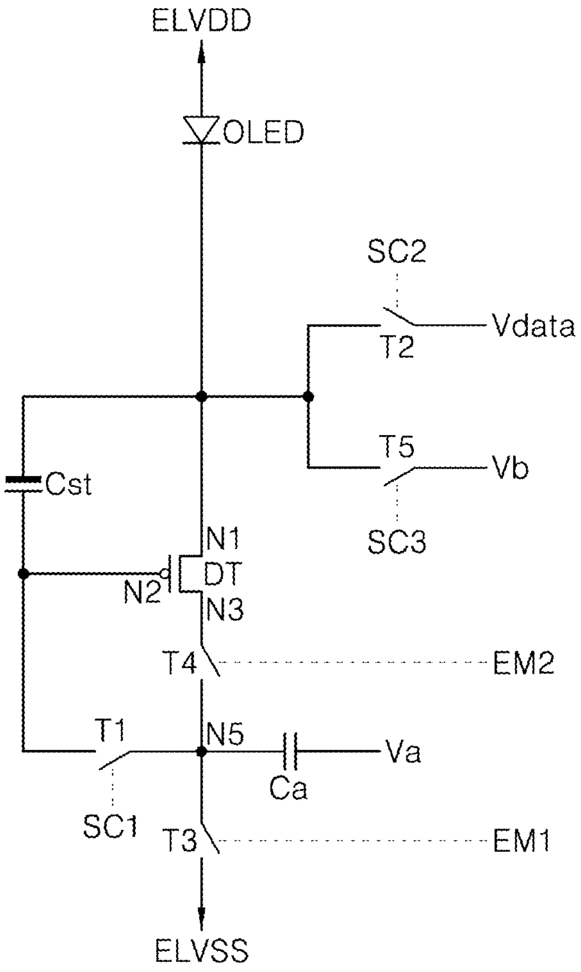
FIG. 28 is a circuit diagram illustrating a pixel circuit of a display apparatus according to a thirteen embodiment of the present disclosure.

FIG. 28 is a circuit diagram illustrating a pixel circuit of a display apparatus according to a thirteen embodiment of the present disclosure.

Referring to FIG. 28, the pixel circuit of the display apparatus includes a driving transistor DT, a light-emitting element OLED, a storage capacitor Cst, a compensation capacitor Ca, a first transistor T1, a second transistor T2, a third transistor T3, a fourth transistor T4, and a fifth transistor T5.

The driving transistor DT includes a first electrode corresponding to a first node N1, a gate electrode corresponding to a second node N2, and a second electrode corresponding to a third node N3. The first electrode and the second electrode may correspond to the drain electrode and source electrode of the driving transistor DT, respectively, or the source electrode and drain electrode thereof, respectively. The driving transistor DT can be formed with a P-type TFT.

The light-emitting element OLED includes an anode electrode connected to the low-potential driving voltage ELVSS and a cathode electrode connected to the first node N1.

The storage capacitor Cst is connected between the first node N1 and the second node N2 of the driving transistor DT.

The compensation capacitor Ca is connected between a fifth node N5 and a first voltage Va. One electrode of the compensation capacitor Ca is connected to the fifth node N5, and the other electrode of the compensation capacitor Ca is connected to the first voltage Va. Here, the fifth node N5 corresponds to one electrode of the compensation capacitor Ca.

The first transistor T1 is connected between the second node N2 and the fifth node N5. The first transistor T1 connects or disconnects the second node N2 and the fifth node N5 in response to the first scan signal SC1.

The second transistor T2 is connected between the first node N1 and the data voltage V data. The second transistor T2 applies a data voltage V data to the first node N1 in response to the second scan signal SC2.

The third transistor T3 is connected between the fifth node N5 and the low-potential driving voltage ELVSS. The third transistor T3 applies the low-potential driving voltage ELVSS to the fifth node N5 in response to the first emission control signal EM1.

The fourth transistor T4 is connected between the third node N3 and the fifth node N5. The fourth transistor T4 connects or disconnects the third node N3 and the fifth node N5 in response to the second emission control signal EM2.

The fifth transistor T5 is connected between the first node N1 and the second voltage Vb. The fifth transistor T5 applies the second voltage Vb to the first node N1 in response to a third scan signal SC3.

Such a display apparatus operates in following separate periods: an initialization period, a compensation period, a data program period, an anode reset period, and an emission period.

During the initialization period, the first transistor T1 connects the second node N2 and the fifth node N5 in response to the first scan signal SC1, and the third transistor T3 applies the low-potential driving voltage ELVSS to the fifth node N5 in response to the first emission control signal EM1. At this time, the low-potential driving voltage ELVSS is applied to one electrode of the compensation capacitor Ca through the fifth node N5, and the first voltage Va is applied to the other electrode of the compensation capacitor Ca. Additionally, the low-potential driving voltage ELVSS is applied to one electrode of the storage capacitor Cst through the fifth node N5 and the first transistor T1. Additionally, the fifth transistor T5 applies the second voltage Vb to the other electrode of the storage capacitor Cst in response to the third scan signal SC3. At this time, the second voltage Vb is applied to the other electrode of the storage capacitor Cst and the cathode electrode of the light-emitting element OLED. By the operation of this initialization period, one electrode of the storage capacitor Cst is initialized to the difference value between the low-potential driving voltage ELVSS and the first voltage Va, and the other electrode of the storage capacitor Cst and the cathode electrode of the light-emitting element OLED are initialized to the second voltage V b.

During the compensation period, the first transistor T1 connects the second node N2 and the fifth node N5 in response to the first scan signal SC1, and the fifth transistor T5 applies the second voltage Vb to the other electrode of the storage capacitor Cst in response to the third scan signal SC3. At this time, the second voltage Vb is applied to one electrode of the compensation capacitor Ca and one electrode of the storage capacitor Cst through the diode connection of the driving transistor DT. During the compensation period, the second voltage Vb and the threshold voltage Vth of the driving transistor DT are applied to one electrode of the storage capacitor Cst, and the second voltage Vb is applied to the other electrode of the storage capacitor Cst, so that the both electrodes of the storage capacitor Cst are maintained at a difference of potential equal to the threshold voltage Vth of the driving transistor.

During the data program period, the first transistor T1 connects the second node N2 and the fifth node N5 in response to the first scan signal SC1, and the second transistor T2 applies the data voltage V data to the other electrode of the storage capacitor Cst in response to the second scan signal SC2. During the operation of this data program period, the data voltage V data is sampled on the storage capacitor Cst.

During the emission period, the third transistor T3 applies the low-potential driving voltage ELVSS to the fifth node N5 in response to the first emission control signal EM1, and the fourth transistor T4 connects the fifth node N5 and the third node N3 in response to the second emission control signal EM2. During the emission period, a current path is formed between the high-potential driving voltage ELVDD and the low-potential driving voltage ELVDD, and the intensity of the current flowing in the current path is determined according to the magnitude of the data voltage V data sampled on the storage capacitor Cst.

As described above, the pixel circuit of the display apparatus can overcome the problematic situation in which the compensation time is restricted to 1H time by including the first transistor T1 and the fourth transistor T4 that diode-connect the driving transistor DT, and using the second voltage Vb unrelated to the data voltage V data to compensate for the characteristics of the driving transistor DT.

In addition, since the pixel circuit of the display apparatus includes the compensation capacitor Ca having one side connected to the fifth node N5 and the other side connected to the first voltage Vb, the threshold voltage of the driving transistor DT can be maintained at the other electrode of the storage capacitor Cst during the compensation period and the data program period. This allows for accurate compensation of the threshold voltage characteristics of the driving transistor DT.

In addition, since the display apparatus operates in the data program period and the compensation period which are divided into two distinct separate periods, a sufficiently long time period can be allotted to the compensation time for compensating for the threshold voltage characteristic of the driving transistor DT, and since a sufficient period of time can be utilized to compensate for the threshold voltage of the driving transistor DT, the compensation error can be minimized.

Additionally, according to some embodiments, at least one of the first to seventh transistors of the pixel circuit may be formed with a P-type thin film transistor or an N-type thin film transistor. For the P-type thin film transistor, the pixel circuit may be driven by inverting a logic high for a scan signal and an emission control signal to a logic low, and inverting a logic low to a logic high. The respective transistors and the driving transistor may be formed with various transistors such as LTPS, Oxide, Single-silicon, and Organic. The light-emitting element OLED can employ a self-light emitting type diode such as an organic light-emitting diode or micro LED. The substrate on which the pixels are formed may be formed with glass, plastic, flexible plastic, wafer, or the like.

A display apparatus according to an embodiment of the present disclosure includes a display panel in which a plurality of pixels are disposed, and a pixel circuit of each of the pixels includes a driving transistor having a first electrode corresponding to a first node, a gate electrode corresponding to a second node, and a second electrode corresponding to a third node; a light-emitting element having an anode electrode connected to the first node and a cathode electrode connected to a low-potential driving voltage; a storage capacitor connected between the second node and the first node; a compensation capacitor having one electrode connected to a fifth node and the other electrode connected to a first voltage; a first transistor connected between the second node and the fifth node; a second transistor connected between the first node and a data voltage; a third transistor connected between a high-potential driving voltage and the fifth node; a fourth transistor connected between the fifth node and the third node; and a fifth transistor connected between the first node and a second voltage.

According to one embodiment, the pixel circuit may operate in following separate periods: an initialization period, a compensation period, a data program period, and an emission period.

According to an embodiment, during the compensation period, the pixel circuit may diode-connect the driving transistor through the first transistor and the fourth transistor, apply the second voltage to one electrode of the storage capacitor and one electrode of the compensation capacitor through the diode-connected driving transistor, and apply the second voltage to the other electrode of the storage capacitor.

According to an embodiment, during the data program period, the pixel circuit may turn off the fourth transistor to disconnect the diode-connection of the driving transistor, apply the data voltage to the other electrode of the storage capacitor, and the threshold voltage of the driving transistor may be maintained through the compensation capacitor at one electrode of the storage capacitor.

According to an embodiment, during the initialization period, the pixel circuit may apply the high-potential driving voltage to the one electrode of the storage capacitor through the third transistor and the first transistor and apply the second voltage to the other electrode of the storage capacitor through the fifth transistor.

According to an embodiment, an anode reset period may be further included between the data program period and the emission period, and, during the anode reset period, the pixel circuit may apply the high-potential driving voltage to the fifth node through the third transistor, and apply the second voltage to the other electrode of the storage capacitor and the anode electrode of the light-emitting element through the fifth transistor; or wherein, during the anode reset period, the pixel circuit applies the second voltage to the other electrode of the storage capacitor and the anode electrode of the light-emitting element through the fifth transistor.

According to an embodiment, an anode reset period may be further included between the data program period and the emission period, and, during the anode reset period, the pixel circuit may turn off the third transistor and turn on the fourth transistor to connect the third node and the fifth node, and turn on the fifth transistor to apply the second voltage to the other electrode of the storage capacitor.

According to an embodiment, an emission-off period may be further included after the emission period, and, during the emission-off period, the pixel circuit may turn on one of the third transistor and the fourth transistor, and turn off the first, second, and fifth transistors; or wherein during the emission-off period, all of the first transistor to the fifth transistor are turned off.

According to an embodiment, the third transistor may be formed with a P-type thin film transistor, and the driving transistor, the first, second, fourth and fifth transistors may be formed with N-type transistors.

According to an embodiment, the first transistor operates in response to a first scan signal, the second transistor operates in response to a second scan signal, the third transistor operates in response to a first emission control signal, the fourth transistor operates in response to a second emission control signal, the fifth transistor operates in response to a third scan signal.

According to an embodiment, the first emission control signal may be set as a first scan signal SC1[N+2] following the first scan signal SC1[N] for use in the operation of the first transistor.

According to an embodiment, the first emission control signal may be set as a third scan signal SC3[N+8] following the third scan signal SC3[N] for use in the operation of the fifth transistor.

According to an embodiment, the first scan signal may be set as a third scan signal SC3[N+8] following the third scan signal SC3[N] for use in the operation of the fifth transistor.

According to an embodiment, the pixel circuit may further include a sixth transistor connected between the fifth node and the compensation capacitor.

According to an embodiment, the sixth transistor may be turned off during periods of time other than the initialization period, the compensation period, and the data program period.

According to an embodiment, the pixel circuit may further include a seventh transistor connected between the anode electrode of the light-emitting element and the anode reset voltage.

According to an embodiment, during the anode reset period, the pixel circuit may apply the anode reset voltage to the anode electrode of the light-emitting element through the seventh transistor and turn on the fourth transistor to connect the fifth node and the third node.

A display apparatus according to an embodiment of the present disclosure may include a display panel in which a plurality of pixels are disposed, and a pixel circuit of each of the pixels may include a driving transistor having a first electrode corresponding to a first node, a gate electrode corresponding to a second node, and a second electrode corresponding to a third node; a light-emitting element having an anode electrode connected to the first node and a cathode electrode connected to a low-potential driving voltage; a storage capacitor connected between the second node and the first node; a compensation capacitor connected between the second node and a first voltage; a first transistor connected between the second node and the fifth node; a second transistor connected between the first node and a data voltage; a third transistor connected between a high-potential driving voltage and the fifth node; a fourth transistor connected between the fifth node and the third node; and a fifth transistor connected between the first node and the second voltage.

According to another embodiment, one electrode of the compensation capacitor may be connected to the gate electrode of the driving transistor and the one electrode of the storage capacitor.

According to another embodiment, the first voltage may be set as one of the high-potential driving voltage and the second voltage.

A display apparatus according to an embodiment of the present disclosure includes a display panel in which a plurality of pixels are disposed, and a pixel circuit of each of the pixels includes a driving transistor having a first electrode corresponding to a first node, a gate electrode corresponding to a second node, and a second electrode corresponding to a third node; a light-emitting element having an anode electrode corresponding to a fourth node and a cathode electrode connected to a low-potential driving voltage; a storage capacitor connected between the second node and the fourth node; a first transistor connected between the second node and the third node; a compensation capacitor connected between the third node and a first voltage; a second transistor connected between the first node and a data voltage; a third transistor connected between a high-potential driving voltage and the third node; a fourth transistor connected between the first node and the fourth node; and a fifth transistor connected between the fourth node and a second voltage.

According to another embodiment, the pixel circuit may further include a sub-fourth transistor connected between the fourth node and the anode electrode of the light-emitting element, and the fourth transistor and the sub-fourth transistor may operate in response to the same signal.

A display apparatus according to an embodiment of the present disclosure includes a display panel in which a plurality of pixels are disposed, and a pixel circuit of each of the pixels includes a driving transistor having a first electrode corresponding to a first node, a gate electrode corresponding to a second node, and a second electrode corresponding to a third node; a light-emitting element having an anode electrode connected to a fourth node and a cathode electrode connected to a low-potential driving voltage; a first transistor connected between the second node and the third node; a compensation capacitor connected between the third node and a first voltage; a storage capacitor connected between the second node and a sixth node; a second transistor connected between the sixth node and a data voltage; a third transistor connected between a high-potential driving voltage and the third node; a fourth transistor connected between the first node and the fourth node; a fifth transistor connected between the fourth node and a second voltage; and a sixth transistor connected between the sixth node and the fourth node.

According to another embodiment, the pixel circuit may operate in following separate periods: an initialization period, a compensation period, a data program period, and an emission period, and, during the initialization period, the high-potential driving voltage may be applied to the one electrode of the storage capacitor and the one electrode of the compensation capacitor, the second voltage may be applied to the other electrode of the storage capacitor, and, during the compensation period, the first node and the fourth node may be connected to each other, the driving transistor may be diode-connected, the second voltage may be applied to the both electrodes of the storage capacitor and the one electrode of the compensation capacitor, and, during the data program period, the connection between the first node and the fourth node and the diode-connection of the driving transistor may be disconnected, the connection between the second node and the third node may be maintained, and the data voltage may be applied to the other electrode of the storage capacitor.

According to another embodiment, during the emission period, the pixel circuit may form a current path between the high-potential driving voltage and the low-potential driving voltage and connect the other electrode of the storage capacitor to the current path through the sixth transistor.

A display apparatus according to an embodiment of the present disclosure includes a display panel in which a plurality of pixels are disposed, and a pixel circuit of each of the pixels includes a driving transistor having a first electrode corresponding to a first node, a gate electrode corresponding to a second node, and a second electrode corresponding to a third node; a light-emitting element having an anode electrode connected to a fourth node and a cathode electrode connected to a low-potential driving voltage; a compensation capacitor connected between the third node and a first voltage; a first transistor connected between the second node and the third node; a storage capacitor having one electrode connected to the second node; a second transistor connected between the other electrode of the storage capacitor and a data voltage; a third transistor connected between a high-potential driving voltage and the third node; a fourth transistor connected between the first node and the fourth node; a fifth transistor connected between the other electrode of the storage capacitor and a second voltage; and a sixth transistor connected between the other electrode of the storage capacitor and the fourth node.

According to another embodiment, the pixel circuit may further include a seventh transistor connected between the fourth node and an anode reset voltage, and apply the anode reset voltage to the anode electrode of the light-emitting element and the first electrode of the driving transistor during an anode reset period.

A display apparatus according to an embodiment of the present disclosure includes a display panel in which a plurality of pixels are disposed, and a pixel circuit of each of the pixels includes a driving transistor having a first electrode corresponding to a first node, a gate electrode corresponding to a second node, and a second electrode corresponding to a third node; a light-emitting element having a cathode electrode connected to the first node and an anode electrode connected to a high-potential driving voltage; a storage capacitor connected between the second node and the first node; a compensation capacitor having one electrode connected to a fifth node and the other electrode connected to a first voltage; a first transistor connected between the second node and the fifth node; a second transistor connected between the first node and a data voltage; a third transistor connected between a low-potential driving voltage and the fifth node; a fourth transistor connected between the fifth node and the third node; and a fifth transistor connected between the first node and a second voltage, and the driving transistor is formed with a P-type thin film transistor (TFT).

A pixel circuit according to an embodiment of the present disclosure includes a light-emitting element; a driving transistor controlling an intensity of current flowing to the light-emitting element; a storage capacitor which samples a data voltage that determines the intensity of the current; a compensation capacitor sampling a threshold voltage of the driving transistor; at least one first transistor diode-connecting the driving transistor; at least one second transistor applying a first voltage unrelated to the data voltage to one electrode and the other electrode of the storage capacitor and one electrode of the compensation capacitor through the diode-connected driving transistor; and at least one third transistor applying the data voltage to the other electrode of the storage capacitor.

According to an embodiment, the pixel circuit may operate in following two separate periods: a compensation period compensating for a threshold voltage characteristic of the driving transistor and a data program period sampling the data voltage.

According to an embodiment, during the compensation period, the pixel circuit may turn on said at least one first transistor to diode-connect the driving transistor and turn on said at least one second transistor to apply the first voltage to both electrodes of the storage capacitor and the one electrode of the compensation capacitor.

According to an embodiment, a second voltage may be connected to the other electrode of the compensation capacitor.

According to an embodiment, during the data program period, the pixel circuit may turn off said at least one first transistor to disconnect the diode-connection of the driving transistor and turn on said at least one third transistor to apply the data voltage to the other electrode of the storage capacitor.

Although the present invention has been described with reference to the drawings provided as examples, the present invention is not limited to the drawings and embodiments disclosed in this disclosure, and it is obvious that various modifications can be made by those skilled in the art without departing from the scope of the technical idea of the present invention. In addition, even if operational effects according to the configuration of the present invention were not explicitly described while explaining the embodiments of the present invention, it is natural that the effects that can be predicted by that configuration should also be acknowledged.

What is claimed is:

1. A display apparatus comprising:

a display panel including a plurality of pixels, wherein a pixel circuit of each of the plurality of pixels includes:

a driving transistor having a first electrode corresponding to a first node, a gate electrode corresponding to a second node, and a second electrode corresponding to a third node;

a light-emitting element having an anode electrode connected to the first node and a cathode electrode connected to a low-potential driving voltage;

a storage capacitor connected to the second node and the first node;

a compensation capacitor having one electrode connected to a fifth node and another electrode connected to a first voltage;

a first transistor connected to the second node and the fifth node;

a second transistor connected to the first node and a data voltage;

a third transistor connected to a high-potential driving voltage and the fifth node;

a fourth transistor connected to the fifth node and the third node; and a fifth transistor connected to the first node and a second voltage.

2. The display apparatus of claim 1, wherein the pixel circuit operates in following separate periods: an initialization period, a compensation period, a data program period, and an emission period.

3. The display apparatus of claim 2, wherein, during the compensation period, the pixel circuit is configured to:

diode-connect the driving transistor through the first transistor and the fourth transistor, apply the second voltage to one electrode of the storage capacitor and the one electrode of the compensation capacitor through the diode-connected driving transistor, and apply the second voltage to another electrode of the storage capacitor.

4. The display apparatus of claim 3, wherein, during the data program period, the pixel circuit is configured to turn off the fourth transistor and disconnect the diode-connection of the driving transistor, and apply the data voltage to the other electrode of the storage capacitor, and wherein a threshold voltage of the driving transistor is maintained through the compensation capacitor at the one electrode of the storage capacitor.

5. The display apparatus of claim 2, wherein, during the initialization period, the pixel circuit is configured to apply the high-potential driving voltage to one electrode of the storage capacitor through the third transistor and the first transistor, and apply the second voltage to another electrode of the storage capacitor through the fifth transistor.

6. The display apparatus of claim 2, wherein an anode reset period is further included between the data program period and the emission period, and during the anode reset period, the pixel circuit is configured to apply the high-potential driving voltage to the fifth node through the third transistor, and apply the second voltage to another electrode of the storage capacitor and the anode electrode of the light-emitting element through the fifth transistor; or wherein, during the anode reset period, the pixel circuit is configured to apply the second voltage to the other electrode of the storage capacitor and the anode electrode of the light-emitting element through the fifth transistor.

7. The display apparatus of claim 2, wherein an anode reset period is further included between the data program period and the emission period, and during the anode reset period, the pixel circuit is configured to turn off the third transistor, turn on the fourth transistor, and connect the third node and the fifth node, and turn on the fifth transistor and apply the second voltage to another electrode of the storage capacitor.

8. The display apparatus of claim 2, wherein an emission-off period is further included after the emission period, and during the emission-off period, the pixel circuit is configured to turn on one of the third transistor and the fourth transistor, and turn off the first transistor, the second transistor, and the fifth transistor; or wherein during the emission-off period, all of the first transistor to the fifth transistor are turned off.

9. The display apparatus of claim 1, wherein the third transistor is a P-type thin film transistor and the driving transistor, the first transistor, the second transistor, the fourth transistor, and the fifth transistor are N-type thin film transistors.

10. The display apparatus of claim 9, wherein:

the first transistor operates in response to a first scan signal;

the second transistor operates in response to a second scan signal;

the third transistor operates in response to a first emission control signal;

the fourth transistor operates in response to a second emission control signal; and the fifth transistor operates in response to a third scan signal.

11. The display apparatus of claim 10, wherein the first emission control signal is set as a first scan signal (SC1[N+2]) following the first scan signal (SC1[N]) to operate the first transistor.

12. The display apparatus of claim 10, wherein the first emission control signal is set as a third scan signal (SC3[N+8]) following the third scan signal (SC3[N]) to operate the fifth transistor.

13. The display apparatus of claim 10, wherein the first scan signal is set as a third scan signal (SC3[N+8]) following the third scan signal (SC3[N]) to operate the fifth transistor.

14. The display apparatus of claim 1, wherein the pixel circuit further includes a sixth transistor connected to the fifth node and the compensation capacitor.

15. The display apparatus of claim 14, wherein the sixth transistor is turned off during periods of time other than an initialization period, a compensation period, and a data program period.

16. The display apparatus of claim 1, wherein the pixel circuit further includes a seventh transistor connected to the anode electrode of the light-emitting element and an anode reset voltage.

17. The display apparatus of claim 16, wherein, during an anode reset period, the pixel circuit is configured to apply the anode reset voltage to the anode electrode of the light-emitting element through the seventh transistor, and turn on the fourth transistor and connect the fifth node and the third node.

18. A display apparatus comprising:

a display panel including a plurality of pixels, wherein a pixel circuit of each of the plurality of pixels includes:

a driving transistor having a first electrode corresponding to a first node, a gate electrode corresponding to a second node, and a second electrode corresponding to a third node;

a light-emitting element having an anode electrode connected to the first node and a cathode electrode connected to a low-potential driving voltage;

a storage capacitor connected to the second node and the first node;

a compensation capacitor connected to the second node and a first voltage;

a first transistor connected to the second node and a fifth node;

a second transistor connected to the first node and a data voltage;

a third transistor connected to a high-potential driving voltage and the fifth node;

a fourth transistor connected to the fifth node and the third node; and a fifth transistor connected to the first node and a second voltage.

19. The display apparatus of claim 18, wherein one electrode of the compensation capacitor is connected to the gate electrode of the driving transistor and one electrode of the storage capacitor.

20. The display apparatus of claim 18, wherein the first voltage is set as one of the high-potential driving voltage and the second voltage.

* * * * *